(12) United States Patent
Sakai et al.

(10) Patent No.: US 9,262,911 B2
(45) Date of Patent: Feb. 16, 2016

(54) INFORMATION PROCESSING APPARATUS, CONTROL METHOD FOR INFORMATION PROCESSING APPARATUS, CONTROL METHOD FOR ELECTRONIC DEVICE, AND STORAGE MEDIUM CONTAINING CONTROL PROGRAM

(75) Inventors: Toshihiko Sakai, Osaka (JP); Yasuhiro Harada, Osaka (JP); Noboru Iwata, Osaka (JP); Hideharu Tajima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 255 days.

(21) Appl. No.: 14/000,464

(22) PCT Filed: Feb. 16, 2012

(86) PCT No.: PCT/JP2012/053639
§ 371 (c)(1),
(2), (4) Date: Aug. 20, 2013

(87) PCT Pub. No.: WO2012/132606
PCT Pub. Date: Oct. 4, 2012

(65) Prior Publication Data
US 2013/0328668 A1    Dec. 12, 2013

(30) Foreign Application Priority Data
Mar. 30, 2011    (JP) ................. 2011-076486

(51) Int. Cl.
*G08C 19/16* (2006.01)
*H04M 1/725* (2006.01)
*G08C 17/00* (2006.01)

(52) U.S. Cl.
CPC ............. *G08C 19/16* (2013.01); *G08C 17/00* (2013.01); *H04M 1/72572* (2013.01); *G08C 2201/91* (2013.01)

(58) Field of Classification Search
CPC ... H04M 1/72572; G08C 17/00; G08C 19/16; G08C 2201/91
USPC .......................................... 340/12.22; 725/81
See application file for complete search history.

(56) References Cited

U.S. PATENT DOCUMENTS

| 6,885,363 B2 * | 4/2005 | Smith | 345/157 |
| 2006/0190538 A1 * | 8/2006 | Hwang et al. | 709/204 |
| 2007/0080940 A1 * | 4/2007 | Aoki et al. | 345/158 |
| 2008/0066123 A1 * | 3/2008 | Igoe et al. | 725/81 |
| 2010/0227587 A1 * | 9/2010 | Ohmoto | 455/411 |

FOREIGN PATENT DOCUMENTS

| JP | 2002-044763 A | 2/2002 |
| JP | 2006-197734 A | 7/2006 |
| JP | 2006-228225 A | 8/2006 |
| JP | 2007-180804 A | 7/2007 |
| JP | 2008-097151 A | 4/2008 |
| JP | 2009-044532 A | 2/2009 |
| JP | 2009-130653 A | 6/2009 |
| JP | 2009-278267 A | 11/2009 |

OTHER PUBLICATIONS

Official Communication issued in International Patent Application No. PCT/JP2012/053639, mailed on Mar. 19, 2012.

* cited by examiner

*Primary Examiner* — Edwin Holloway, III
(74) *Attorney, Agent, or Firm* — Keating & Bennett, LLP

(57) ABSTRACT

An information processing apparatus (1) includes a processing execution unit (19) that, if a positional-relationship specification unit (18) detects that a positional relationship between an electronic device (2) and the own apparatus is held continuously for a predetermined time or longer, references a processing specification table (17), specifies processing, and executes the specified processing.

15 Claims, 12 Drawing Sheets

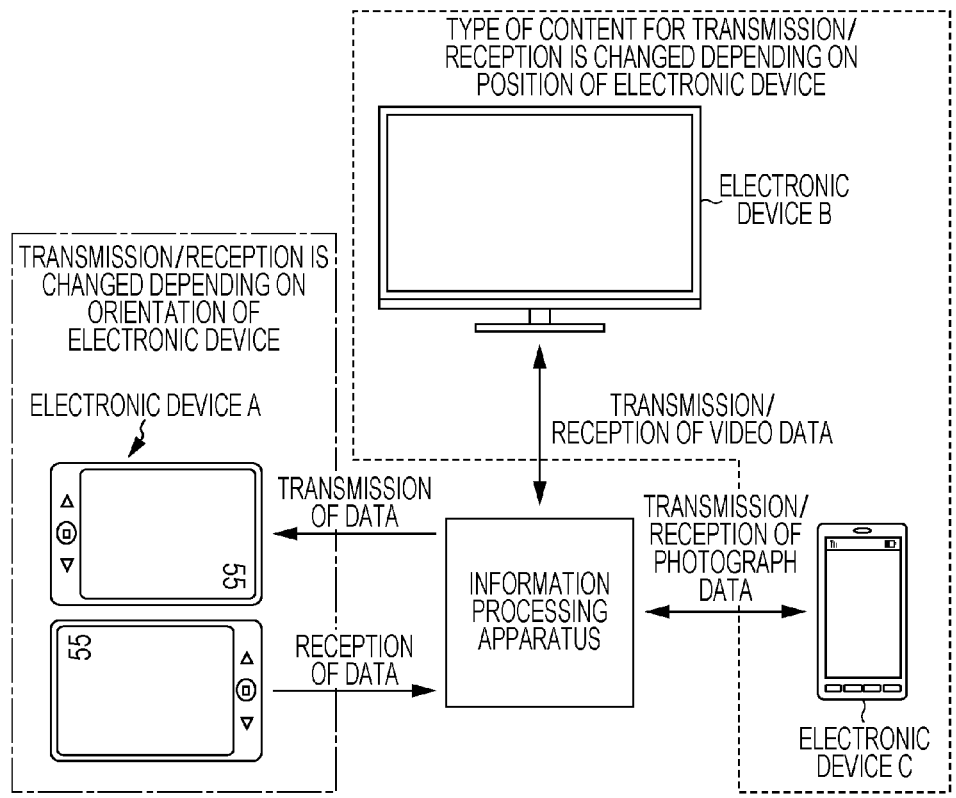
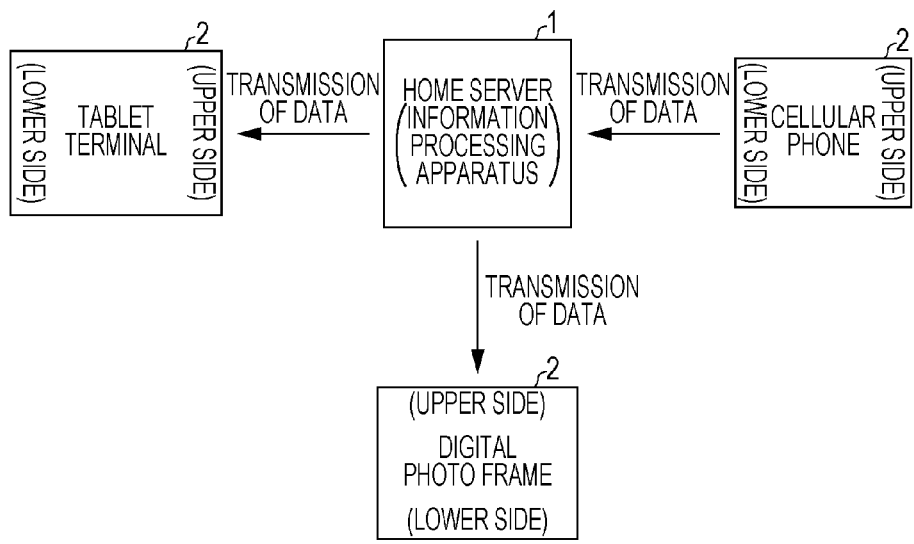

| POSITIONAL RELATIONSHIP | PROCESSING |
|---|---|
| UPPER END OF ELECTRONIC DEVICE FACES OWN APPARATUS | TRANSMIT CONTENT TO ELECTRONIC DEVICE |
| LOWER END OF ELECTRONIC DEVICE FACES OWN APPARATUS | REQUEST ELECTRONIC DEVICE TO TRANSMIT CONTENT |
| ⋮ | ⋮ |

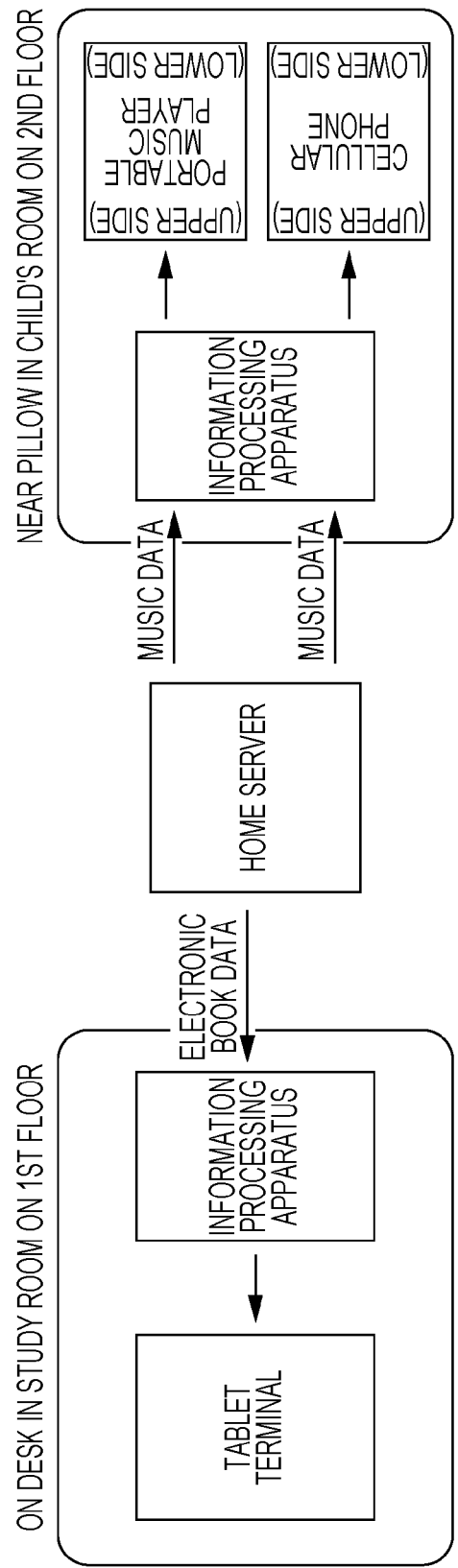

FIG. 7

| POSITIONAL RELATIONSHIP | PROCESSING |
|---|---|
| ELECTRONIC DEVICE IS POSITIONED AT LEFT SIDE OF OWN APPARATUS | REQUEST ELECTRONIC DEVICE TO TRANSMIT ELECTRONIC BOOK |
| ELECTRONIC DEVICE IS POSITIONED AT RIGHT SIDE OF OWN APPARATUS | REQUEST ELECTRONIC DEVICE TO TRANSMIT IMAGE DATA |
| ELECTRONIC DEVICE IS POSITIONED IN FRONT OF OWN APPARATUS | CAUSE ELECTRONIC DEVICE TO DISPLAY TRANSMISSION ALLOW/ DISALLOW SELECTION SCREEN OF CONTENT |
| ELECTRONIC DEVICE IS POSITIONED ABOVE OWN APPARATUS | CAUSE ELECTRONIC DEVICE TO DISPLAY RECEPTION ALLOW/ DISALLOW SELECTION SCREEN OF CONTENT |
| ⋮ | ⋮ |

FIG. 8

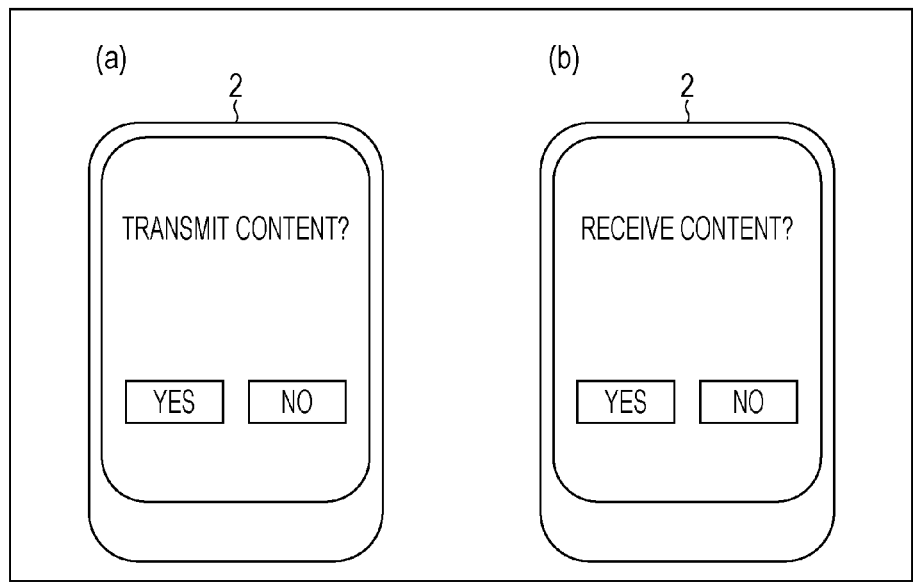

| POSITIONAL RELATIONSHIP | PROCESSING |
|---|---|
| ELECTRONIC DEVICE IS HELD IN RIGHT HAND OF USER | TRANSMIT CONTENT TO ELECTRONIC DEVICE |
| ELECTRONIC DEVICE IS HELD IN LEFT HAND OF USER | REQUEST ELECTRONIC DEVICE TO TRANSMIT CONTENT |
| ⋮ | ⋮ |

FIG. 13

| POSITIONAL RELATIONSHIP | TYPE OF ELECTRONIC DEVICE | PROCESSING | PROCESSING WHEN POSITIONAL RELATIONSHIP IS DISSOLVED |
|---|---|---|---|
| ELECTRONIC DEVICE IS POSITIONED ABOVE OWN APPARATUS | CELLULAR PHONE | REQUEST ELECTRONIC DEVICE TO TRANSMIT IMAGE DATA | NOTIFY ABOUT RECEPTION OR NON-RECEPTION OF IMAGE DATA |
| ELECTRONIC DEVICE IS POSITIONED IN FRONT OF OWN APPARATUS, AT DISTANCE SMALLER THAN X1 | CELLULAR PHONE | CHARGE ELECTRONIC DEVICE WITH OUTPUT Y1 | KEY LOCK FOR ELECTRONIC DEVICE |
| ELECTRONIC DEVICE IS POSITIONED IN FRONT OF OWN APPARATUS, AT DISTANCE OF X1 OR LARGER AND SMALLER THAN X2 | CELLULAR PHONE | CHARGE ELECTRONIC DEVICE WITH OUTPUT Y2 | KEY LOCK FOR ELECTRONIC DEVICE |
| ELECTRONIC DEVICE IS POSITIONED IN FRONT OF OWN APPARATUS, AT DISTANCE OF X2 OR LARGER AND SMALLER THAN X3 | CELLULAR PHONE | CHARGE ELECTRONIC DEVICE WITH OUTPUT Y3 | KEY LOCK FOR ELECTRONIC DEVICE |
| ELECTRONIC DEVICE IS POSITIONED ABOVE OWN APPARATUS | TABLET TERMINAL | REQUEST ELECTRONIC DEVICE TO TRANSMIT ELECTRONIC BOOK | NOTIFY ABOUT RECEPTION OR NON-RECEPTION OF ELECTRONIC BOOK |
| ... | ... | ... | ... |

INFORMATION PROCESSING APPARATUS, CONTROL METHOD FOR INFORMATION PROCESSING APPARATUS, CONTROL METHOD FOR ELECTRONIC DEVICE, AND STORAGE MEDIUM CONTAINING CONTROL PROGRAM

TECHNICAL FIELD

The present invention relates to an information processing apparatus and so forth that performs processing relating to an electronic device in accordance with the position and so forth of the electronic device.

BACKGROUND ART

Recently, an information processing apparatus and an electronic device increase in performance and functionality. Accordingly, operation of a device becomes further troublesome and complicated. In particular, people in countries or regions unfamiliar with such devices and elderly people have serious difficulty in such operation. Owing to this, there are suggested various user interfaces that can be easily used even by users unfamiliar with the operation of the devices.

For example, PTL 1 describes that a RFID tag is mounted on a remote controller of a television set, and RFID readers that read the RFID tag are arranged at a plurality of positions in a house. PTL 1 also describes that the location of the remote controller in the house is specified from the reading result of the RFID reader, and control information of the television set corresponding to the specified position is transmitted from a home server to the remote controller. Accordingly, the control information can be re-set for the television set without an operation by a user.

CITATION LIST

Patent Literature

PTL 1: Japanese Unexamined Patent Application Publication No. 2006-228225 (published Aug. 31, 2006)

SUMMARY OF INVENTION

Technical Problem

However, with the above-described related art, the re-setting processing is always performed regardless of user's intension every time when the device with the RFID tag approaches the RFID reader.

For example, it is assumed that RFID readers are installed in a living room and one's own room in a house and television sets are installed in the living room and the own room, and a user moves from a certain room to the own room through the living room while holding a remote controller with a RFID tag.

In this case, with the technique in PTL 1, the RFID reader in the living room detects the RFID tag first, and hence the remote controller is set for the television set in the living room. Then, the RFID reader in the own room detects the RFID tag next, and hence the remote controller is set for the television set in the own room.

That is, in this case, the remote controller is set for the television set in the living room once, contrarily to user's intention of "moving to the own room and watching the television set in the own room." Processing not meeting user's intention is not necessary and is not desirable.

In this example, since the remote controller is finally set for the television set in the own room according to user's intention, this may not result in a serious problem. However, if a configuration immediately performs processing when the RFID tag is detected like PTL 1, the configuration may cause a serious problem when being applied to setting other than the remote controller setting.

For example, it is considered that processing for transmission of data from an information processing apparatus such as a home server to an electronic device such as a cellular phone is realized through application of the invention in PTL 1. In this case, data is transmitted when the RFID tag attached to the electronic device is detected by any of the RFID readers installed in the house. Hence, when the user walks in the house while holding the electronic device, transmission of data, which is not intended by the user, may be repeated.

The invention is made in light of the aforementioned problems, and an object of the invention is to provide an information processing apparatus and so forth that can execute processing without a button operation or the like, and hardly performs processing not intended by a user.

Solution to Problem

To solve the above-described problems, an information processing apparatus of the invention is an information processing apparatus that performs processing relating to an electronic device. The information processing apparatus includes detection means for detecting that a positional relationship between the electronic device and the own apparatus is a predetermined positional relationship; and processing execution means for, if the detection means detects that the positional relationship between the electronic device and the own apparatus is held continuously for a predetermined time or longer, referencing correspondence information in which the predetermined positional relationship is associated with processing to be executed for the positional relationship, specifying the processing, and executing the specified processing.

Also, to solve the above-described problems, a control method for an information processing apparatus of the invention is a control method for an information processing apparatus that performs processing relating to an electronic device. The control method includes a detection step of detecting that a positional relationship between the electronic device and the information processing apparatus is a predetermined positional relationship; a processing specification step of, if it is detected that the positional relationship between the electronic device and the information processing apparatus is held continuously for a predetermined time or longer in the detection step, referencing correspondence information in which the predetermined positional relationship is associated with processing to be executed for the positional relationship and specifying the processing; and a processing execution step of executing the processing specified in the processing specification step.

With the above-described configuration, if it is detected that the positional relationship between the electronic device and the information processing apparatus is held continuously for the predetermined time or longer, the processing specified with reference to the correspondence information and corresponding to the positional relationship is executed.

Accordingly, a user can cause the information processing apparatus to execute the processing only by bringing the electronic device and the information processing apparatus into the predetermined positional relationship. That is, with the above-described configuration, a button operation or the like is not required for the electronic device or the information processing apparatus, and even a user who is unfamiliar with handling such a device can easily operate the device.

Alternatively, predetermined processing may be executed by bringing the electronic device and the information processing apparatus into the predetermined positional relationship without a button operation or the like on the information processing apparatus, and also, other processing may be executed by a button operation or the like, which has been performed in related art. Even in this case, a button operation or the like for executing the predetermined processing is not required. Hence, user's operation is facilitated.

Also, with the above-described configuration, the processing is executed if it is detected that the positional relationship is held continuously for the predetermined time or longer. Accordingly, if the user does not intend to cause the information processing apparatus to execute the processing, but if the electronic device and the information processing apparatus are unintentionally brought into the predetermined positional relationship, the processing not intended by the user is not performed.

The positional relationship includes a position of the electronic device with respect to the information processing apparatus and an orientation of the electronic device with respect to the information processing apparatus. For example, the positional relationship may be, for example, "the electronic device is positioned at the right side of the information processing apparatus," "the electronic device is positioned in an XX direction with respect to the information processing apparatus," and "the upper side of the electronic device faces the information processing apparatus."

Also, the positional relationship may be expected from a positional relationship between the user of the electronic device and the electronic device. For example, processing may be associated with a positional relationship between the electronic device and the information processing apparatus when "the electronic device is detected by the information processing apparatus in a state in which the user of the electronic device holds the electronic device in the right hand."

Also, to solve the above-described problems, an electronic device of the invention is an electronic device that receives an instruction or information from an information processing apparatus and performs processing. The electronic device includes electronic-device detection means for detecting that a positional relationship between the information processing apparatus and the own device is a predetermined positional relationship and the positional relationship is held continuously for a predetermined time or longer; notification means for notifying the information processing apparatus about the positional relationship detected by the electronic-device detection means; and reception means for receiving an instruction or information from the information processing apparatus, the instruction or the information corresponding to the positional relationship that is specified by the information processing apparatus with reference to correspondence information in which the predetermined positional relationship is associated with the instruction or the information to be transmitted for the positional relationship, and that is notified by the notification means.

Also, to solve the above-described problems, a control method for an electronic device is a control method for an electronic device that receives an instruction or information from an information processing apparatus and performs processing. The control method includes a detection step of detecting that a positional relationship between the information processing apparatus and the electronic device is a predetermined positional relationship and the positional relationship is held continuously for a predetermined time or longer; a notification step of notifying the information processing apparatus about the positional relationship detected in the detection step; and a reception step of receiving an instruction or information from the information processing apparatus, the instruction or the information corresponding to the positional relationship that is specified by the information processing apparatus with reference to correspondence information in which the predetermined positional relationship is associated with the instruction or the information to be transmitted for the positional relationship, and that is notified in the notification step.

With the above-described configuration, if it is detected that the positional relationship with respect to the information processing apparatus is held continuously for the predetermined time or longer, the electronic device notifies the information processing apparatus about the positional relationship. Then, the electronic device receives the instruction or the information specified by the information processing apparatus by using the notification and the correspondence information, from the information processing apparatus. The electronic device that receives the instruction or the information from the information processing apparatus and performs the processing.

Accordingly, the user can cause the electronic device to execute the processing corresponding to the positional relationship only by bringing the electronic device and the information processing apparatus into the predetermined positional relationship. That is, with the above-described configuration, a button operation or the like is not required for the electronic device or the information processing apparatus to cause the electronic device to perform the processing, and even the user who is unfamiliar with handling such a device can easily operate the device.

Also, with the above-described configuration, since the processing is executed if it is detected that the positional relationship is held continuously for the predetermined time or longer, if the user does not intend to execute the processing, but if the electronic device and the information processing apparatus are unintentionally brought into the predetermined positional relationship, the processing not intended by the user is not performed.

Also, to solve the above-described problems, a processing execution system of the invention is a processing execution system including an electronic device and an information processing apparatus that performs processing relating to the electronic device, the system causing the information processing apparatus to execute the processing. The system includes detection means included in the electronic device or the information processing apparatus, the detection means detecting that a positional relationship between the electronic device and the information processing apparatus is a predetermined positional relationship; and processing execution means included in the information processing apparatus, if the detection means detects that the positional relationship between the electronic device and the information processing apparatus is held continuously for a predetermined time or longer, the processing execution means referencing correspondence information in which the predetermined positional relationship is associated with processing to be executed for the positional relationship, specifying the processing, and executing the specified processing. With this configuration, advantages similar to those of the information processing apparatus or the electronic device are attained.

Advantageous Effects of Invention

As described above, an information processing apparatus of the invention includes detection means for detecting that a positional relationship between the electronic device and the own apparatus is a predetermined positional relationship; and processing execution means for, if the detection means detects that the positional relationship between the electronic device and the own apparatus is held continuously for a predetermined time or longer, referencing correspondence information in which the predetermined positional relationship is associated with processing to be executed for the positional relationship, specifying the processing, and executing the specified processing.

Also, as described above, a control method for an information processing apparatus of the invention includes a detection step of detecting that a positional relationship between the electronic device and the information processing apparatus is a predetermined positional relationship; a processing specification step of, if it is detected that the positional relationship between the electronic device and the information processing apparatus is held continuously for a predetermined time or longer in the detection step, referencing correspondence information in which the predetermined positional relationship is associated with processing to be executed for the positional relationship and specifying the processing; and a processing execution step of executing the processing specified in the processing specification step.

Also, the electronic device of the invention includes electronic-device detection means for detecting that a positional relationship between the information processing apparatus and the own device is a predetermined positional relationship and the positional relationship is held continuously for a predetermined time or longer; notification means for notifying the information processing apparatus about the positional relationship detected by the electronic-device detection means; and reception means for receiving an instruction or information from the information processing apparatus, the instruction or the information corresponding to the positional relationship that is specified by the information processing apparatus with reference to correspondence information in which the predetermined positional relationship is associated with the instruction or the information to be transmitted for the positional relationship, and that is notified by the notification means.

Also, the control method for the electronic device of the invention includes a detection step of detecting that a positional relationship between the information processing apparatus and the electronic device is a predetermined positional relationship and the positional relationship is held continuously for a predetermined time or longer; a notification step of notifying the information processing apparatus about the positional relationship detected in the detection step; and a reception step of receiving an instruction or information from the information processing apparatus, the instruction or the information corresponding to the positional relationship that is specified by the information processing apparatus with reference to correspondence information in which the predetermined positional relationship is associated with the instruction or the information to be transmitted for the positional relationship, and that is notified in the notification step.

With the above-described configurations, a user can cause the information processing apparatus to execute the processing only by bringing the electronic device and the information processing apparatus into the predetermined positional relationship. That is, with the above-described configurations, advantages are attained such that a button operation or the like is not required for the electronic device or the information processing apparatus, and even a user who is unfamiliar with handling such a device can easily operate the device.

Also, with the above-described configurations, since the processing is executed if it is detected that the positional relationship is held continuously for the predetermined time or longer, if the user does not intend to execute the processing, but if the electronic device and the information processing apparatus are unintentionally brought into the predetermined positional relationship, the processing not intended by the user is not performed.

BRIEF DESCRIPTION OF DRAWINGS

FIG. 2 is an illustration showing an overview of the processing execution system.

FIG. 3 is an illustration explaining an example of transmission or reception of data in accordance with the orientation of the electronic device with respect to the information processing apparatus.

FIG. 6 is an illustration explaining an example of performing processing corresponding to the position of the electronic device, the illustration showing an example in which the type of content to be requested is changed in accordance with a room where an electronic device is present and the position of the electronic device in the room.

FIG. 7 is an illustration showing an example of a processing specification table used in the example in FIG. 5.

FIG. 8 is an illustration showing an example of a screen display for causing a user of the own device to check allowance or disallowance for transmission or reception of a content and to select the allowance or the disallowance, FIG. 8(a) showing an example of a screen display to select the allowance or the disallowance for the transmission of a content, FIG. 8(b) showing an example of a screen display to select the allowance or the disallowance for the reception of a content.

FIG. 13 is an illustration showing an example of a processing specification table used by the information processing apparatus.

DESCRIPTION OF EMBODIMENTS

Figure 1:
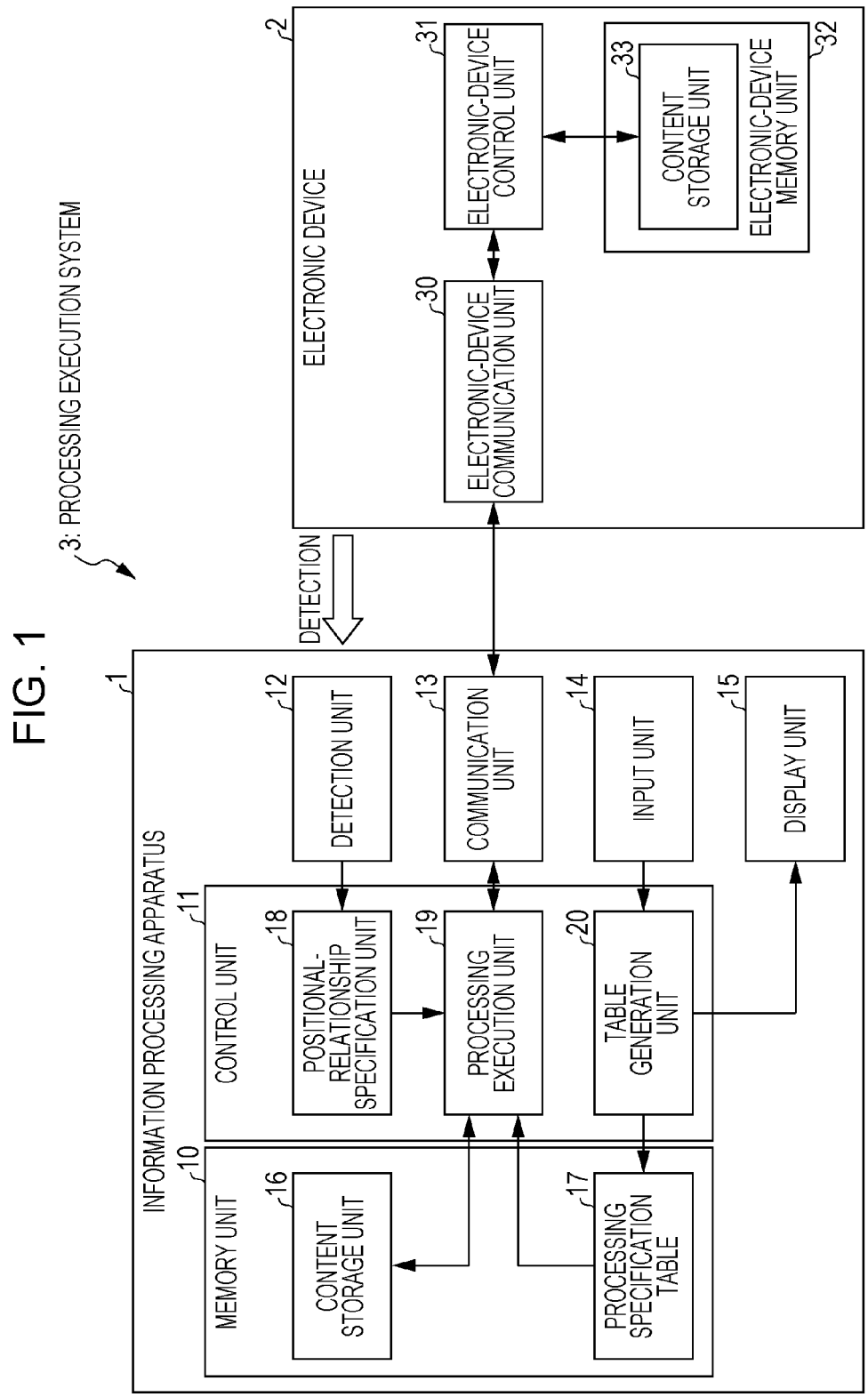
FIG. 1 is a block diagram showing configurations of primary portions of an information processing apparatus and an electronic device included in a processing execution system according to an embodiment of the invention.

Embodiments of the invention are described below in detail with reference to FIGS. 1 to 15.

[First Embodiment]

An overview of a first embodiment of the invention is described first with reference to FIG. 2. FIG. 2 is an illustration showing an overview of a processing execution system of this embodiment. As illustrated, the processing execution system of this embodiment is a system including an electronic device and an information processing apparatus.

With this processing execution system, if it is detected that the positional relationship between the electronic device and the information processing apparatus is a predetermined positional relationship and the predetermined positional relationship is held for a predetermined time or longer, processing corresponding to the positional relationship is executed.

That is, with this processing execution system, by bringing the electronic device and the information processing apparatus into the predetermined positional relationship, processing corresponding to the positional relationship can be executed. Accordingly, a user of the electronic device and the information processing apparatus can execute desirable processing without performing a button input operation or the like on the information processing apparatus.

In this case, it is assumed that the information processing apparatus is a personal computer, and the electronic device includes electronic devices of a tablet terminal (electronic device A), a television receiver (electronic device B), and a smartphone (electronic device C). However, the electronic device and the information processing apparatus are not particularly limited as long as relating processing is performed. For example, the information processing apparatus may be a recorder for a Blu-ray Disc, a DVD, or a HDD and a reproducer for such a media, a television receiver, or a set-top box. Also, the electronic device may be a cellular phone, a tablet terminal (including an electronic book terminal), a notebook-size personal computer, or a portable game player.

For example, as illustrated, in case of a positional relationship, in which the upper side of the electronic device A faces the information processing apparatus, data stored in the information processing apparatus is transmitted from the information processing apparatus to the electronic device A. In contrast, in case of a positional relationship, in which the lower side of the electronic device A faces the information processing apparatus, data stored in the electronic device A is transmitted from the electronic device A to the information processing apparatus.

Also, for example, as illustrated, in case of a positional relationship, in which the electronic device B is positioned behind the information processing apparatus, transmission and reception of video data are performed between the information processing apparatus and the electronic device B. In contrast, transmission and reception of photograph data are performed between the electronic device C positioned at a lateral side of the information processing apparatus.

That is, with the illustrated processing execution system, transmission and reception of a predetermined type of data are executed without an input operation on the electronic device or the information processing apparatus, in accordance with the direction in which the electronic device is positioned with respect to the information processing apparatus. Accordingly, the user can share desirable data between the information processing apparatus and the electronic device very easily.

[Configurations of Information Processing Apparatus and Electronic Device]

The configurations of the information processing apparatus and the electronic device included in the processing execution system are described next with reference to FIG. 1. FIG. 1 is a block diagram showing configurations of primary portions of an information processing apparatus 1 and an electronic device 2 included in a processing execution system 3.

As illustrated, the information processing apparatus 1 includes a memory unit 10 that stores various data used in the information processing apparatus 1, a control unit 11 that controls the entire information processing apparatus 1, a detection unit 12 that detects the electronic device 2, a communication unit 13 for communication with the electronic device 2, an input unit 14 that receives an input of a user to the information processing apparatus 1, and a display unit 15 that displays an image under control by the control unit 11.

Also, the memory unit 10 includes a content storage unit 16 that stores contents of, for example, movie data, image data, and audio data, and stores a processing specification table (correspondence information) 17. The processing specification table 17 is a table in which a positional relationship between the information processing apparatus 1 and the electronic device 2 is associated with processing executed if the positional relationship is held for a predetermined time or longer. The processing specification table 17 is described later with specific examples.

The control unit 11 includes a positional-relationship specification unit (detection means) 18, a processing execution unit (processing execution means) 19, and a table generation unit 20.

The positional-relationship specification unit 18 determines whether or not the positional relationship between the information processing apparatus 1 and the electronic device 2 matches any of predetermined positional relationships from the detection result of the detection unit 12, and if the matching is determined, checks whether or not the positional relationship is held for a predetermined time or longer. If the held state is checked, the positional-relationship specification unit 18 outputs the positional relationship to the processing execution unit 19.

The predetermined positional relationships are positional relationships described in the processing specification table 17. Hence, the detection unit 12 performs the detection corresponding to the types of the predetermined positional relationships so that the positional-relationship specification unit 18 can determine whether or not the positional relationship matches the predetermined positional relationship from the detection result.

For example, if "the orientation of the electronic device 2 with respect to the information processing apparatus 1" is described as a predetermined positional relationship, the detection unit 12 outputs the detection result that allows the orientation of the electronic device 2 with respect to the information processing apparatus 1 to be specified. Specifically, the detection unit 12 may be formed of an image acquisition sensor such as a CMOS sensor. An image of the electronic device 2 acquired by the detection unit 12 may be output as the detection result. In this case, the positional-relationship specification unit 18 can specify the orientation of the electronic device 2 with respect to the information processing apparatus 1 by analyzing the image of the detection result, and determine whether or not the positional relationship matches the predetermined positional relationship.

Also, for example, if "the direction in which the electronic device 2 is positioned with respect to the information processing apparatus 1" is described as a predetermined positional relationship, the detection unit 12 outputs the detection result that allows the direction in which the electronic device 2 is positioned with respect to the information processing apparatus 1 to be specified. Specifically, the detection unit 12 may be formed of an infrared sensor or the like. Infrared rays may be emitted in multiple directions, and the presence of an object that blocks the infrared rays may be output as the detection result. In this case, the positional-relationship specification unit 18 can specify that the electronic device 2 is present in the direction in which the object that blocks the infrared rays is detected.

The processing execution unit 19 specifies processing associated with the positional relationship output from the positional-relationship specification unit 18 with reference to the processing specification table 17, and executes the specified processing. For example, if processing of transmitting a content to the electronic device 2 is specified, a subject content is red from the content storage unit 16, and transmits the read content from the communication unit 13 to the electronic device 2. Also, for example, if processing of receiving a content from the electronic device is specified, a content is requested to the electronic device 2, the requested content is received, and the received content is stored in the content storage unit 16.

The table generation unit 20 generates the processing specification table 17 by associating the positional relationship with the processing. Also, the table generation unit 20 corrects the positional relationship or the processing described in the processing specification table 17, and hence updates the processing specification table 17. Processing of generating the processing specification table 17 by the table generation unit 20 is described later with a specific example.

Next, the configuration of the electronic device 2 is described. As illustrated, the electronic device 2 includes an electronic-device communication unit 30, an electronic-device control unit 31, and an electronic-device memory unit 32 having a content storage unit 33.

The electronic-device communication unit 30 allows the electronic device 2 to communicate with the information processing apparatus 1. Accordingly, it is assumed that the electronic-device communication unit 30 can communicate with the communication unit 13 of the information processing apparatus 1. Also, the electronic-device control unit 31 controls the entire operation of the electronic device 2. The electronic-device memory unit 32 stores various data used in the electronic device 2. The content storage unit 33 is similar to the content storage unit 16 of the information processing apparatus 1.

If the electronic-device control unit 31 receives an instruction from the information processing apparatus 1, the electronic-device control unit 31 is operated in response to the instruction. For example, if a transmission request for a content is received from the information processing apparatus 1, the electronic-device control unit 31 reads the requested content from the content storage unit 33, and transmits the read content from the electronic-device communication unit 30 to the information processing apparatus 1. Also, if a content is received from the information processing apparatus 1, the electronic-device control unit 31 stores the received content in the content storage unit 33.

[Example of Performing Processing in Accordance with Orientation of Electronic Device]

Figures 4, 5:
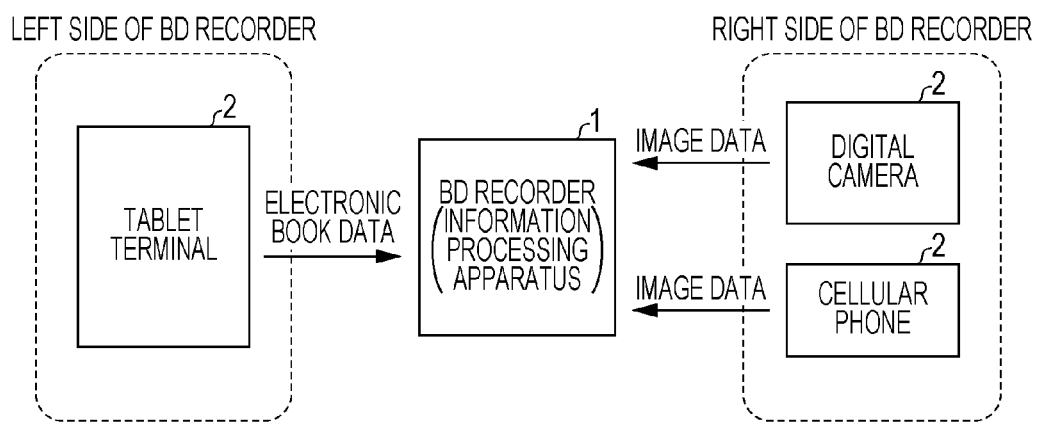
FIG. 4 is an illustration showing an example of a processing specification table used in the example.
FIG. 5 is an illustration explaining an example of performing processing corresponding to the position of the electronic device, the illustration showing an example in which the type of content to be requested is changed between a case in which an electronic device is positioned at the right side of the information processing apparatus and a case in which the electronic device is positioned at the left side.

Next, an example of performing the processing in accordance with the orientation of the electronic device 2 is described with reference to FIGS. 3 and 4. FIG. 3 is an illustration explaining an example of transmission or reception of data in accordance with the orientation of the electronic device 2 with respect to the information processing apparatus 1. FIG. 4 is an illustration showing an example of the processing specification table 17 used in the example.

FIG. 3 shows an example, in which the information processing apparatus 1 is a home server, and the electronic device 2 includes electronic devices 2 of a tablet terminal, a digital photo frame, and a cellular phone. From among these electronic devices 2, the tablet terminal and the digital photo frame are oriented such that the upper sides thereof face the home server.

The home server detects establishment of such arrangement, and transmits data to the tablet terminal and the digital photo frame. That is, the user can cause the electronic device 2 to acquire data from the information processing apparatus 1 through an operation of orienting the upper side of the electronic device 2 (the tablet terminal or the digital photo frame) to the information processing apparatus 1 (the home server).

Also, in FIG. 3, the lower side of the cellular phone faces the home server. The home server detects establishment of such arrangement, requests the cellular phone to transmit data, and receives the data. That is, the user can cause the information processing apparatus 1 to acquire data in the electronic device 2 through an operation of orienting the lower side of the electronic device 2 (the cellular phone) to the information processing apparatus 1 (the home server).

In the processing specification table 17 of FIG. 4, processing "transmit content to electronic device" is associated with a positional relationship "upper end of electronic device faces own apparatus." Also, processing "request electronic device to transmit content" is associated with a positional relationship "lower end of electronic device faces own apparatus." It is to be noted that the content represents data, such as a movie, a still image, sound, or text.

The information processing apparatus 1 performs the processing "transmit content to electronic device" if the positional relationship "upper end of electronic device faces own apparatus" is established with reference to the processing specification table 17. Similarly, the processing "request electronic device to transmit content" is performed if the positional relationship "lower end of electronic device faces own apparatus" is established.

Specifically, the positional-relationship specification unit 18 of the information processing apparatus 1 determines whether or not the positional relationship between the information processing apparatus 1 and the electronic device 2 matches the positional relationship "upper end of electronic device faces own apparatus" or "lower end of electronic device faces own apparatus" from the detection result of the detection unit 12. If the matching is determined, it is checked whether or not the positional relationship is held for a predetermined time or longer. If the held state is checked, the positional-relationship specification unit 18 outputs the positional relationship to the processing execution unit 19.

The processing execution unit 19, which has received the output, references the processing specification table 17, and specifies the processing "transmit content to electronic device" in the case "upper end of electronic device faces own apparatus." Also, the processing execution unit 19 specifies the processing "request electronic device to transmit content"

in the case "lower end of electronic device faces own apparatus," and executes the specified processing.

Accordingly, the content is transmitted from the information processing apparatus 1 to the electronic device 2 in the case "upper end of electronic device faces own apparatus," and the content is transmitted from the electronic device 2 to the information processing apparatus 1 in the case "lower end of electronic device faces own apparatus."

The "orientation" described in the processing specification table 17 is not limited to the above-described example. For example, an "orientation" in which a right side surface, a left side surface, an upper surface, or a lower surface of the electronic device 2 faces the information processing apparatus 1 may be described in the processing specification table 17. Also, the processing associated with the "orientation" is not limited to the above-described example.

However, for intuitive operation by the user, like the above-described example, opposite processing is preferably associated with an inverted orientation so that opposite processing (transmission and reception, key-lock and key-unlock, etc.) is performed when the orientation of the electronic device 2 is inverted.

[Example of Performing Processing in Accordance with Position of Electronic Device]

Next, an example of performing the processing in accordance with the position of the electronic device 2 is described with reference to FIGS. 5 to 8.

FIG. 5 is an illustration explaining an example of performing processing corresponding to the position of the electronic device 2, the illustration showing an example in which the type of content to be requested is changed between a case in which the electronic device 2 is positioned at the right side of the information processing apparatus 1 and a case in which the electronic device 2 is positioned at the left side.

In the same drawing, the information processing apparatus 1 is a BD (Blu-ray Disc) recorder, and the electronic device 2 includes electronic devices 2 of a tablet terminal, a digital camera, and a cellular phone. From among these electronic devices 2, the tablet terminal is positioned at the left side of the BD recorder.

If the BD recorder detects establishment of such arrangement, the BD recorder receives electronic book data from the tablet terminal. That is, the user can cause the information processing apparatus 1 to acquire the electronic book data from among the data stored in the electronic device 2, through an operation of putting the electronic device 2 (the tablet terminal) at the left side (or holding the electronic device 2 at the left side) of the information processing apparatus 1 (the BD recorder).

In contrast, in FIG. 5, the digital camera and the cellular phone are positioned at the right side of the BD recorder. If the BD recorder detects establishment of such arrangement, the BD recorder receives image data from the digital camera and the cellular phone. That is, the user can cause the information processing apparatus 1 to acquire the image data from among the data stored in the electronic device 2, through an operation of putting the electronic device 2 (the digital camera or the cellular phone) at the right side (or holding the electronic device 2 at the right side) of the information processing apparatus 1 (the BD recorder).

Such processing can be realized by using the processing specification table 17 in FIG. 7. FIG. 7 is an illustration showing an example of the processing specification table 17 used in the example in FIG. 5.

In the processing specification table 17 of FIG. 7, processing "request electronic device to transmit electronic book" is associated with a positional relationship "electronic device is positioned at left side of own apparatus." Also, processing "request electronic device to transmit image data" is associated with a positional relationship "electronic device is positioned at right side of own apparatus."

When the processing specification table 17 is used, the positional-relationship specification unit 18 of the information processing apparatus 1 determines whether or not the positional relationship between the information processing apparatus 1 and the electronic device 2 matches the positional relationship "electronic device is positioned at left side of own apparatus" or "electronic device is positioned at right side of own apparatus" from the detection result of the detection unit 12. If the matching is determined, it is checked whether or not the positional relationship is held for a predetermined time or longer. If the held state is checked, the positional-relationship specification unit 18 outputs the positional relationship to the processing execution unit 19.

The processing execution unit 19, which has received the output, references the processing specification table 17, specifies the processing "request electronic device to transmit electronic book" in the case "electronic device is positioned at left side of own apparatus," and specifies the processing "request electronic device to transmit image data" in the case "electronic device is positioned at right side of own apparatus."

The electronic-device control unit 31 of the electronic device 2, which has received such a request, reads the requested data from the content storage unit 33, and transmits the read data to the information processing apparatus 1. It is to be noted that the data of the content stored in the content storage unit 33 include attribute information indicative of its attribute. The electronic-device control unit 31 references the attribute information, and extracts the electronic book data or the image data. The attribute indicates, for example, the type or property of a content, such as a movie, a still image, or sound. The concept of the attribute includes generated or updated date and time, a creator, and so forth, of data.

Accordingly, the electronic book data is transmitted from the information processing apparatus 1 to the electronic device 2 in the case "electronic device is positioned at left side of own apparatus," and the image data is transmitted from the electronic device 2 to the information processing apparatus 1 in the case "electronic device is positioned at right side of own apparatus."

Alternatively, the positional relationship may be determined with both the position and the orientation. For example, the processing specification table 17 may include a positional relationship "electronic device is positioned at left side of own apparatus and upper side of electronic device faces own apparatus."

Also, in the processing specification table 17 of FIG. 7, processing "cause electronic device to display transmission allow/disallow selection screen of content" is associated with a positional relationship "electronic device is positioned in front of own apparatus." Also, processing "cause electronic device to display reception allow/disallow selection screen of content" is associated with a positional relationship "electronic device is positioned above own apparatus."

Accordingly, if the positional relationship between the information processing apparatus 1 and the electronic device 2 matches the positional relationship "electronic device is positioned in front of own apparatus," and it is checked that the positional relationship is held for a predetermined time or longer from the detection result of the detection unit 12, the processing execution unit 19 performs the processing "cause electronic device to display transmission allow/disallow selection screen of content." Specifically, the processing execution unit 19 causes the user of the electronic device 2 to check whether the content may be transmitted from the electronic device 2 to the information processing apparatus 1.

Similarly, if the positional relationship between the information processing apparatus 1 and the electronic device 2 matches the positional relationship "electronic device is positioned above own apparatus," and it is checked that the positional relationship is held for a predetermined time or longer, the processing execution unit 19 performs the processing "cause electronic device to display reception allow/disallow selection screen of content." Specifically, the processing execution unit 19 transmits an instruction to the electronic device 2 and causes the user of the electronic device 2 to check whether the content may be transmitted from the information processing apparatus 1 to the electronic device 2.

The electronic device 2, which has received such an instruction, provides a screen display to cause the user of the own device to check allowance or disallowance for transmission or reception of the content and to select the allowance or the disallowance. For example, a screen display illustrated in FIG. 8 may be provided.

FIG. 8 is an illustration showing an example of a screen display for causing the user of the own device to check allowance or disallowance for transmission or reception of the content and to select the allowance or the disallowance. FIG. 8(a) shows an example of a screen display to select the allowance or the disallowance for the transmission of the content. FIG. 8(b) shows an example of a screen display to select the allowance or the disallowance for the reception of the content.

In the example of FIG. 8(a), a message "transmit content?" and items "YES" and "NO" for the selection by the user are displayed. With this message, the user of the electronic device 2 can recognize that the content is going to be transmitted from the electronic device 2 to the information processing apparatus 1, and by selecting the item "YES" or "NO," the user can select the allowance or the disallowance for the transmission.

Also, in the example of FIG. 8(b), a message "receive content?" and icons "YES" and "NO" for the selection by the user are displayed. With this message, the user of the electronic device 2 can recognize that the content is going to be transmitted from the information processing apparatus 1 to the electronic device 2, and by selecting the item "YES" or "NO," the user can select the allowance or the disallowance for the reception.

As described above, by causing the electronic device 2 to check the allowance or the disallowance for the transmission of the content, a content, which is not intended by the user of the electronic device 2, can be prevented from being transmitted or received. Such a message or an image displayed by the electronic device 2 may be stored in the electronic device 2 like the above-described example, or the information processing apparatus 1 may transmit a message or an image to cause the electronic device 2 to display the message or the image.

In the above-described example, it is expected that the user selects the item "YES" or "NO" through a button operation or the like. However, the selection may be made by changing the positional relationship between the information processing apparatus 1 and the electronic device 2. In this case, processing of selecting "YES" may be associated with a certain positional relationship, and processing of selecting "NO" may be associated with another positional relationship in the processing specification table 17.

For example, it may be determined that the processing of selecting "YES" is performed, if it is detected that the electronic device 2 is positioned above the information processing apparatus 1, the screen for selecting the item "YES" or "NO" is displayed, and then the electronic device 2 is detected at the right side of the information processing apparatus 1. Also, it may be determined that the processing of selecting "NO" is performed, if the electronic device 2 is detected at the left side. Accordingly, a button operation or the like is no longer required even when the item "YES" or "NO" is selected.

The information processing apparatus 1 may include a plurality of information processing apparatuses, and the information processing apparatuses 1 may be installed in a plurality of rooms. If the electronic device 2 is positioned in a room different from the room of the home server, or if the electronic device 2 is positioned at a certain distance from the home server, the home server can perform processing in accordance with the position of the electronic device 2.

This is described below with reference to FIG. 6. FIG. 6 illustrates an example in which the type of content to be requested is changed in accordance with a room where the electronic device 2 is present and the position of the electronic device 2 in the room. The drawing illustrates an example in which the electronic device 2 is electronic devices of a tablet terminal, a portable music player, and a cellular phone. Also, as illustrated, a home server is arranged in a living room on the first floor. The information processing apparatus 1 and the tablet terminal are arranged on a desk in a study room on the first floor, and the information processing apparatus 1, the portable music player, and the cellular phone are arranged near a pillow in child's room on the second floor.

If it is detected that the tablet terminal is put at the left side of the information processing apparatus 1 as illustrated, the information processing apparatus 1 on the desk in the study room on the first floor transmits an instruction to the home server to transmit electronic book data to the tablet terminal. That is, if the user puts the tablet terminal at the left side of the information processing apparatus 1 on the desk in the study room, the electronic book data is automatically transmitted from the home server to the tablet terminal.

As described above, the information processing apparatus 1 may transmit an instruction or information to a device (in this example, the home server) different from the electronic device 2, and hence predetermined processing (in this example, the transmission of the electronic book data) corresponding to the positional relationship between the electronic device 2 and the information processing apparatus 1 may be performed.

Alternatively, the data transmission to the tablet terminal may be performed through the information processing apparatus 1. In this case, the information processing apparatus 1 transmits the instruction to the home server to cause the home server to transmit the electronic book data to the own apparatus, and transmits the electronic book data received from the home server in response to the instruction, to the tablet terminal.

Alternatively, if the home server has a function of specifying the processing corresponding to the positional relationship and executing the processing like the information processing apparatus 1, processing similar to the above processing can be realized even by transmitting information indicative of the positional relationship from the information processing apparatus 1 to the home server.

In this case, the information processing apparatus 1 transmits the information indicative of the positional relationship between the own apparatus and the tablet terminal to the home server. Then, the home server, which has received the information, performs processing of transmitting the electronic book data to the tablet terminal, the processing which corresponds to the positional relationship indicated by the information.

The electronic book data to be transmitted may be a type corresponding to the position of the electronic device 2 of the transmission target. For example, if the electronic device 2 has a predetermined positional relationship with respect to the information processing apparatus 1 arranged on the desk in the child's room, data of a textbook and a reference book may be transmitted from the home server to the electronic device 2 from among the electronic book data. In this way, the information processing apparatus 1 can execute proper processing corresponding to the position of the electronic device 2.

Also, for example, if the information processing apparatus 1 can specify the orientation of the electronic device 2 from the detection result of the detection unit 12, processing corresponding to the position and the orientation may be performed. That is, if the electronic device 2 is positioned at the right side of the information processing apparatus 1 and the upper side of the electronic device 2 faces the information processing apparatus 1, like the case in which the electronic device 2 is arranged near the pillow in the child's room on the second floor in FIG. 6, the home server may automatically transmit music data to the electronic device 2. Similarly, in a case of a positional relationship in which the electronic device 2 is positioned at the right side of the information processing apparatus 1 and the lower side of the electronic device 2 faces the information processing apparatus 1, the electronic device 2 may be instructed to transmit music data to the home server.

In this example, the processing may be executed if it is checked that the conditions of both the position and the orientation are satisfied. However, the processing may be executed if it is checked that any of the conditions is satisfied, and then other processing may be executed if it is checked that the other condition is satisfied.

For example, the information processing apparatus 1 may check whether or not the upper side of the electronic device 2 faces the own apparatus, and if it is checked that the upper side faces the own apparatus, the information processing apparatus 1 may determine the data transmission to the electronic device 2. Then, after the information processing apparatus 1 determines the data transmission to the electronic device 2, the information processing apparatus 1 may check the position of the electronic device 2, specify the type of content corresponding to the position, and transmit the specified type of content to the electronic device 2.

Alternatively, when the information processing apparatus 1 determines the data transmission from the own apparatus to the electronic device 2, the information processing apparatus 1 may provide a display for causing the user to select the allowance or the disallowance for the data transmission, or a display indicative of correspondence between the position of the electronic device 2 and the type of content to be transmitted. Alternatively, the information processing apparatus 1 may give an instruction to the electronic device 2 to provide such a display.

In this way, to determine the processing of "transmitting a predetermined type of content to the electronic device 2," the user changes the positional relationship and the orientation of the electronic device by specifying the position and the orientation of the electronic device 2 stepwise every predetermined time interval, operation feeling similar to that an operation is performed by pressing a button of a remote controller can be realized.

In the description provided above, the example, in which the positional relationship with respect to the electronic device 2 is directly detected, has been described. However, the positional relationship may be indirectly detected. For example, the positional relationship between the electronic device 2 and the user may be detected as the positional relationship between the electronic device 2 and the information processing apparatus 1. This is described below with reference to FIG. 9.

Figures 9, 10:
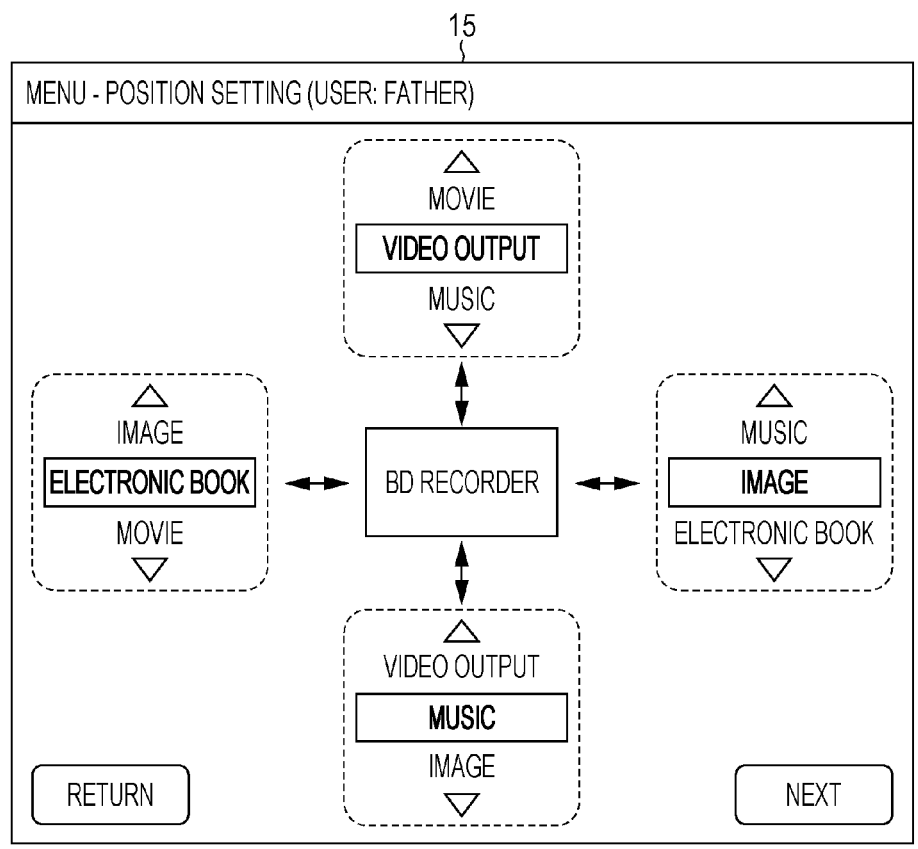
FIG. 9 is an illustration showing an example of a processing specification table in which a positional relationship between an electronic device and a user is associated with processing.
FIG. 10 is an illustration showing an example of an operation screen displayed when the processing specification table is generated.

FIG. 9 is an illustration showing an example of a processing specification table 17 in which a positional relationship between the electronic device 2 and the user is associated with processing. As illustrated, processing "transmit content to electronic device" is associated with a positional relationship "electronic device is held in right hand of user." Also, processing "request electronic device to transmit content" is associated with a positional relationship "electronic device is held in left hand of user."

Accordingly, if the positional relationship matches the positional relationship "electronic device is held in right hand of user" from the detection result of the detection unit 12 and if it is checked that the positional relationship is held for a predetermined time or longer, the processing execution unit 19 performs the processing "transmit content to electronic device." Also, if the positional relationship matches the positional relationship "electronic device is held in left hand of user" and if it is checked that the positional relationship is held for a predetermined time or longer, the processing execution unit 19 performs the processing "request electronic device to transmit content."

In this case, the detection unit 12 outputs the detection result that allows the positional-relationship specification unit 18 to specify the positional relationship "electronic device is held in left hand of user" or "electronic device is held in right hand of user." For example, the detection unit 12 may be formed of an image acquisition sensor such as a CMOS sensor. An image of the electronic device 2 and an image of the user acquired by the detection unit 12 may be output as the detection result. In this case, the positional-relationship specification unit 18 can determine the hand of the user holding the electronic device 2 by analyzing the image of the detection result.

Also, the positional-relationship specification unit 18 may have a function of specifying the type of the electronic device 2, or a function as type specification means for specifying the type of the electronic device. In this case, even when the positional relationship between the information processing apparatus 1 and the electronic device 2 is the same, if the type of electronic device 2 is different, a content suitable for the type can be transmitted or received. For example, in the case of the positional relationship "electronic device is positioned at left side of own apparatus," the processing "transmit electronic book to electronic device" may be associated if the electronic device is the tablet terminal, and the processing "transmit image data to electronic device" may be associated if the electronic device is the cellular phone. Of course, the type specification means may be provided separately from the positional-relationship specification unit 18. Also, the type specification method is not particularly limited. For example, transmission of information for specifying the type of the electronic device 2 may be requested to the electronic device 2, and the type may be specified by referencing the information received in response to the request.

[Generation of Processing Specification Table]

Next, processing of generating the processing specification table 17 by the table generation unit 20 is described with reference to FIG. 10. FIG. 10 is an illustration showing an example of an operation screen displayed when the processing specification table 17 is generated.

In the illustrated operation screen, "menu-position setting" is displayed in an upper portion of the screen. Accordingly, the user checks that this screen is a menu screen for setting the position. Also, the screen displays that the user as a setting subject of the position is "father." That is, it is expected here that the position may be registered every user.

To allow registration for each user, the processing specification table 17 is generated for each user, is associated with information for specifying the user, and is stored. The user for which the processing specification table 17 is used may be preparatorily set by the user. Alternatively, when the detection unit 12 detects the electronic device 2, the user of the electronic device 2 is determined, and the processing specification table 17 of the user may be automatically applied. The user of the electronic device 2 may be determined by acquiring information for specifying the user of the electronic device 2 from the electronic device 2, or by capturing an image of the user and analyzing the captured image.

In the illustrated operation screen, a picture of a BD recorder is displayed at the center of the screen. That is, in this example, the information processing apparatus 1 is the BD recorder. Also, candidates for registration processing are displayed at the upper side, lower side, left side, and right side of the BD recorder. The user can associate the processing of the candidate with the position at the upper side, lower side, left side, or right side, by selecting the displayed candidate.

In the illustrated operation screen, "image," "electronic book," "movie," "video output," and "music" are displayed as the candidates. From among these candidates, the "image," "electronic book," "movie," and "music" indicate processing of requesting transmission of image data, electronic book data, movie data, and music data (song data) to the electronic device 2. Also, the "video output" indicates processing of causing the electronic device 2 to provide video output. Of course, the processing to be associated with the positional relationship is not limited to the examples, and desirable processing relating to the electronic device 2 and the information processing apparatus 1 may be associated.

In the illustrated operation screen, the candidates "movie," "video output," and "music" are displayed at the upper side of the BD recorder, and a cursor is aligned on the "video output." In this state, "next" in the lower right portion of the operation screen is selected and hence the selection is determined. The processing "video output" is registered at the position above the BD recorder.

Specifically, the table generation unit 20 detects that the above determination operation is performed. Thus, the processing specification table 17, in which the processing of receiving a content from the electronic device 2 and provides the video output is associated with the positional relationship in which the electronic device 2 is positioned above the information processing apparatus 1, is generated. If the processing specification table 17 is already present, the positional relationship and the processing are added to the processing specification table 17, and hence the processing specification table 17 is updated. Also, in the existing processing specification table 17, if other processing is associated with the positional relationship, newly registered processing is described instead of the existing processing, and hence the processing specification table 17 is updated.

The processing with the cursor aligned thereon may be switched by selecting any of triangles displayed at the upper sides and lower sides of the candidates, and hence by scrolling the candidates. Also, if "return" in the lower left portion of the operation screen is selected, the processing specification table 17 is not generated or updated, and a screen displayed before the operation screen is displayed, is displayed again.

[Flow of Processing]

Figure 11:
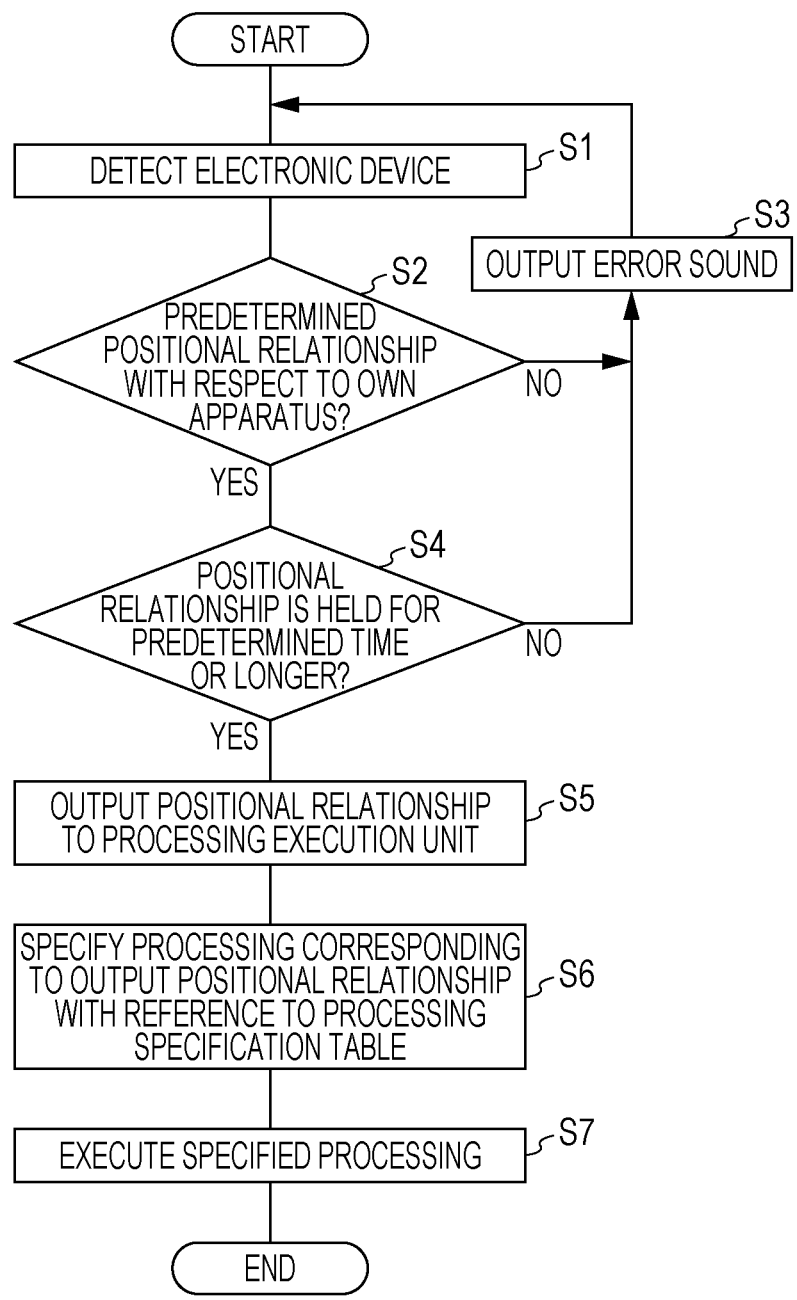
FIG. 11 is a flowchart showing an example of processing executed by the information processing apparatus.

Next, a flow of processing executed by the information processing apparatus 1 is described with reference to FIG. 11. FIG. 11 is a flowchart showing an example of processing executed by the information processing apparatus 1.

First, the detection unit 12 detects the electronic device 2 (S1), and outputs the detection result to the positional-relationship specification unit 18. Then, the positional-relationship specification unit 18 determines which one of predetermined positional relationships matches the positional relationship between the information processing apparatus 1 and the detected electronic device 2 from the output detection result (S2; detection step). The predetermined positional relationships are included in the processing specification table 17.

If it is determined that the positional relationship does not match any of the predetermined positional relationships (NO in S2), the positional-relationship specification unit 18 causes the information processing apparatus 1 to output an error sound to notify the user about that the positional relationship is improper (S3), and the processing returns to S1. Alternatively or additionally, in S3, the notification to the user may use light and an image instead of the error sound or in addition to the error sound. Accordingly, the user of the electronic device 2 recognizes that the positional relationship does not establish the predetermined positional relationship for causing the information processing apparatus 1 to execute the processing, and the user can correct the position of the electronic device 2. Alternatively, the error sound may be output from the electronic device 2. In this case, an instruction for outputting the error sound is transmitted from the information processing apparatus 1 to the electronic device 2.

If the user provides such a positional relationship without an intention of causing the information processing apparatus 1 to execute the processing, the user may possibly feel the error sound noisy. In this case, the processing in S3 may be omitted.

In contrast, if it is determined that the positional relationship matches the predetermined positional relationship (YES in S2), the positional-relationship specification unit 18 determines whether or not the positional relationship is held for a predetermined time or longer (S4). Specifically, the positional-relationship specification unit 18 determines whether or not the positional relationship is held by acquiring the detection result of the detection unit 12 at this time.

The predetermined time is not particularly limited. However, the predetermined time is preferably a time that substantially allows at least a situation, in which the user intentionally makes communication with the information processing apparatus 1, to be expected. For example, the predetermined time may be in a range from 1 second to 10 seconds.

If it is determined that the positional relationship is not held (NO in S4), the positional-relationship specification unit 18 causes the information processing apparatus 1 to output the error sound (S3), and the processing returns to S1. In this case, the notification may be made to the user about that the positional relationship is changed, by using an image or a speech in addition to the error sound. Accordingly, the user can recognize that the processing is no longer executed because the positional relationship is changed.

In contrast, if it is determined that the positional relationship is held (YES in S4), the positional-relationship specification unit 18 outputs the positional relationship, which has been determined as being held, to the processing execution unit 19 (S5). Then, the processing execution unit 19 references the processing specification table 17 stored in the memory unit 10, and specifies processing corresponding to the positional relationship output from the positional-relationship specification unit 18 (S6; processing specification step).

Finally, the processing execution unit 19 executes the processing specified in S6 (S7; processing execution step). Thus, the processing executed by the information processing apparatus 1 is ended. With a certain positional relationship, if processing associated with the positional relationship is executed, the processing may not be performed unless the positional relationship is dissolved and the positional relationship is established again. Alternatively, the processing may be performed again when a predetermined time elapses. In the latter case, for example, the update of a content stored in the electronic device 2 may be periodically reflected on the information processing apparatus 1.

[Second Embodiment]

Figure 12:
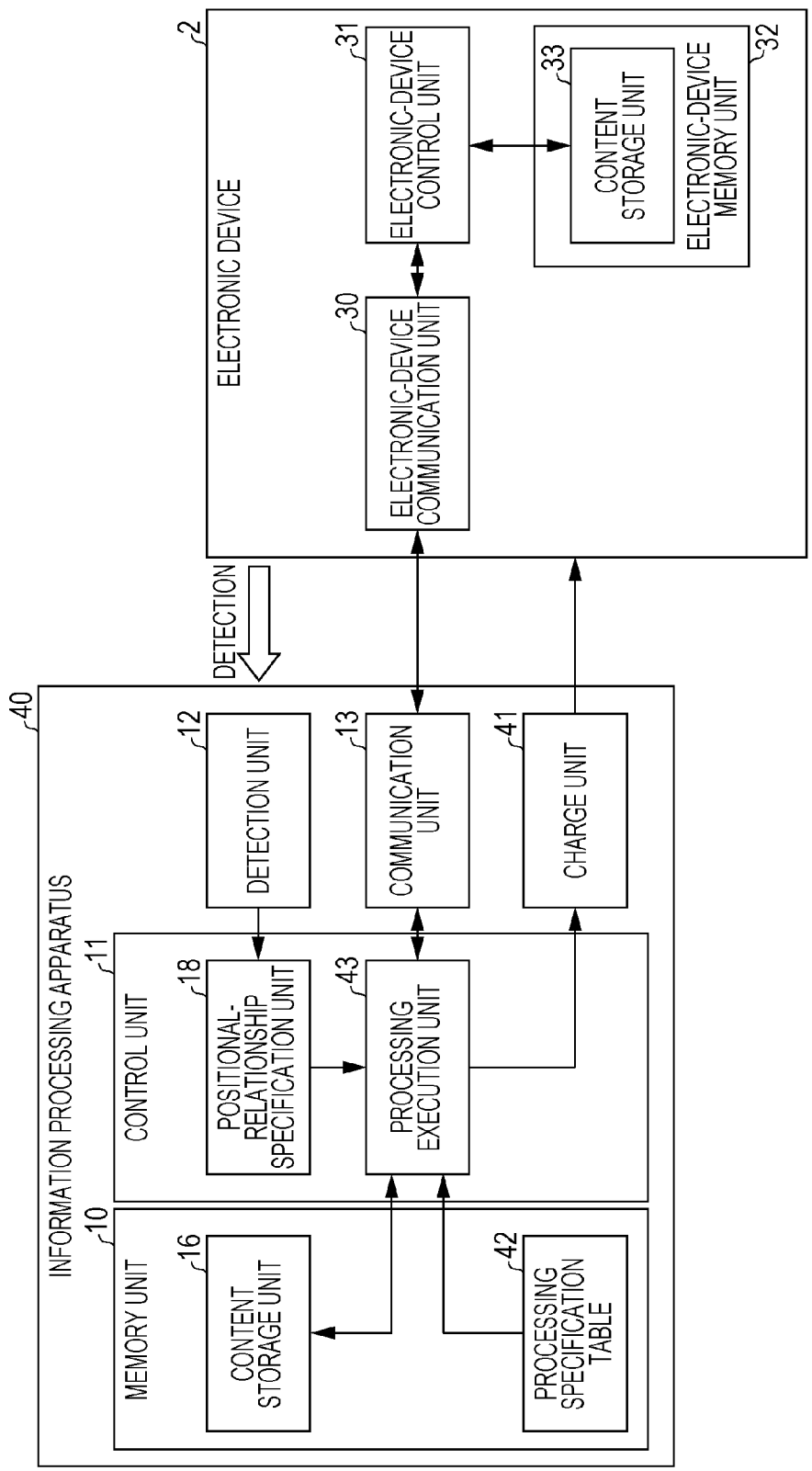
FIG. 12 is a block diagram showing configurations of primary portions of an information processing apparatus and an electronic device according to another embodiment of the invention.
Figure 14:
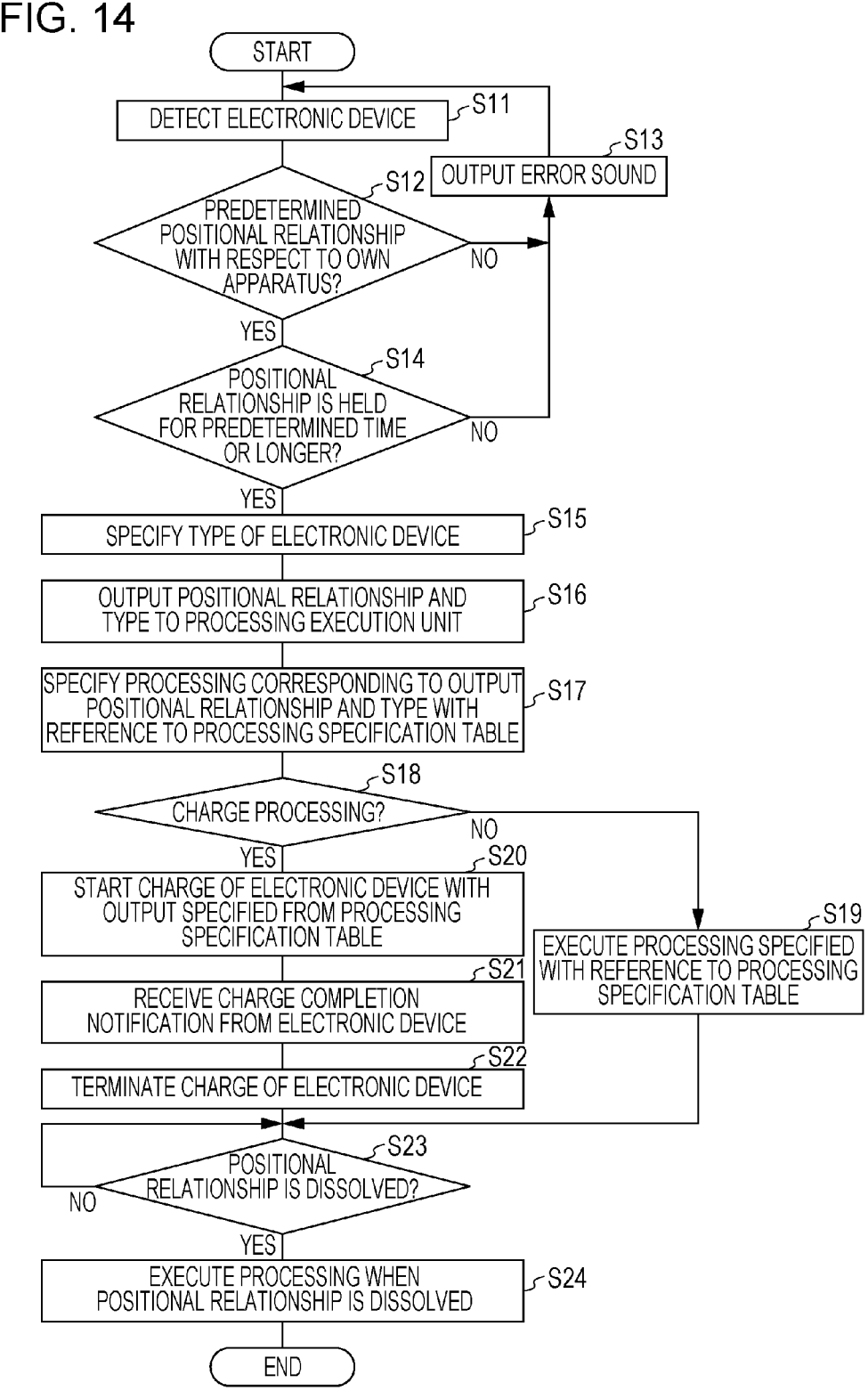
FIG. 14 is a flowchart showing an example of processing executed by the information processing apparatus.

Next, a processing execution system according to a second embodiment of the invention is described with reference to FIGS. 12 to 14. The processing execution system of this embodiment includes an information processing apparatus 40 and an electronic device 2. The information processing apparatus 40 differs from the information processing apparatus 1 in that the information processing apparatus 40 can charge the electronic device 2, and the information processing apparatus 40 performs predetermined processing even if a predetermined positional relationship is dissolved. In the following description, the same reference signs are applied to configurations similar to those in the above-described embodiment, and the description thereof is omitted.

[Configuration of Information Processing Apparatus]

First, a configuration of the information processing apparatus 40 is described with reference to FIG. 12. FIG. 12 is a block diagram showing configurations of primary portions of the information processing apparatus 40 and the electronic device 2. The information processing apparatus 40 differs from the information processing apparatus 1 in FIG. 1 in that the information processing apparatus 40 includes a charge unit 41, the processing specification table 17 is replaced with a processing specification table (correspondence information, dissolution correspondence information) 42, and the processing execution unit 19 is replaced with a processing execution unit (processing execution means) 43. The configuration of the electronic device 2 is similar to that in the example in FIG. 1. In the example in FIG. 12, the table generation unit 20, the input unit 14, and the display unit 15 are not illustrated. However, these configurations may be included.

The charge unit 41 charges the electronic device 2 by wireless feed. The output of the charge unit 41 is variable under control of the processing execution unit 43.

The processing specification table 42 is a table in which a positional relationship between the information processing apparatus 1 and the electronic device 2 is associated with processing to be executed if the positional relationship is held for a predetermined time or longer. Also, in the processing specification table 42, the type of the electronic device 2 and processing to be executed when the positional relationship is dissolved are associated.

Hence, by using the processing specification table 42, processing corresponding to the type of the electronic device 2 may be executed, and even if the positional relationship is dissolved, processing corresponding to that situation may be executed.

The processing specification table 42 may be, for example, a table shown in FIG. 13. FIG. 13 is an illustration showing an example of the processing specification table 42. In the processing specification table 42 in FIG. 13, described as the type of the electronic device 2 is a "cellular phone" or a "tablet terminal."

That is, if it is determined that the type of the electronic device 2 is the "cellular phone," the information processing apparatus 40 selects processing associated with the "cellular phone." Also, if it is determined that the type of the electronic device 2 is the "tablet terminal," processing associated with the "tablet terminal" is selected.

Further, in the processing specification table 42 in FIG. 13, for each positional relationships, processing "notify about reception or non-reception of image data," "key lock for electronic device," and "notify about reception or non-reception of electronic book" are described as processing when the positional relationship is dissolved.

That is, the information processing apparatus 40 performs predetermined processing described in the processing specification table 42 when a certain positional relationship is established, and also execute the above-described processing described in the processing specification table 42 even when the positional relationship is dissolved.

For example, it is assumed that, when the electronic device 2 is a cellular phone, the electronic device 2 is arranged above the information processing apparatus 40. In this case, the detection unit 12 detects the electronic device 2, and the positional-relationship specification unit 18 determines the positional relationship "electronic device is positioned above own apparatus" is established from the detection result of the detection unit 12.

Also, if the positional-relationship specification unit 18 determines that the positional relationship is held for a predetermined time or longer, the positional-relationship specification unit 18 specifies the type of the electronic device 2. That is, the positional-relationship specification unit 18 of this embodiment also has a function as type specification means for specifying the type of an electronic device. Of course, the type specification means may be provided separately from the positional-relationship specification unit 18. Also, the type specification method is not particularly limited. For example, transmission of information for specifying the type of the electronic device 2 may be requested to the electronic device 2, and the type may be specified by referencing the information received in response to the request. The positional-relationship specification unit 18 outputs the specified type and the positional relationship to the processing execution unit 43.

The processing execution unit 43, which has received the output of the type and the positional relationship references the processing specification table 42, specifies processing "request electronic device to transmit image data," and executes the processing.

Also, if the positional-relationship specification unit 18 determines that the positional relationship with respect to the electronic device 2 is dissolved from the detection result of the detection unit 12, the positional-relationship specification unit 18 outputs the situation to the processing execution unit 43. The processing execution unit 43, which has received the output, references the processing specification table 42, specifies the processing "notify about reception or non-reception of image data," and executes the processing.

That is, in this example, by arranging the electronic device 2, which is the cellular phone, above the information processing apparatus 40, transmission of image data is requested from the information processing apparatus 40 to the electronic device 2. If the arrangement of the electronic device 2 is changed, the information processing apparatus 1 notifies whether or not the reception of the image data is performed.

Accordingly, the user can transmit the image data of the electronic device 2 to the information processing apparatus 40 and can check whether or not the image data is acquired by the information processing apparatus 40 without a button operation or the like. The notification for the reception or non-reception may be performed by, for example, a sound or an image.

Also, since the processing "key lock for electronic device" is performed when the positional relationship is dissolved, it is convenient for the user because the user does not need a troublesome work of key lock when the user takes the electronic device 2 out. Further, for example, even if another person takes the electronic device 2 out while the electronic device 2 is charged, the electronic device 2 can be prevented from being used or information held in the electronic device 2 can be prevented from being read. Of course, the processing performed when the positional relationship is dissolved is not limited to these examples, and may be any processing relating to the information processing apparatus 1 and the electronic device 2 performed when the positional relationship is dissolved.

To unlock the key, authentication such as input of a password is typically performed. Hence, "processing of providing a screen display to request input of information (password etc.) for authentication" may be described for a certain positional relationship.

Also, in the processing specification table 42 in FIG. 13, processing of charging the electronic device 2 is associated with a predetermined positional relationship. To be more specific, processing of charge with an increased output of the charge unit 41 is associated with a positional relationship at a larger distance (in other words, processing of charge with a decreased output of the charge unit 41 is associated with a positional relationship at a smaller distance) so that the electronic device 2 is charged with a voltage in a proper range at any distance with respect to the electronic device 2.

Specifically, processing of "charge electronic device with output Y1" is associated with a positional relationship "electronic device is positioned in front of own apparatus, at distance smaller than X1." Processing "charge electronic device with output Y2" is associated with a positional relationship "electronic device is positioned in front of own apparatus, at distance of X1 or larger and smaller than X2." Processing "charge electronic device with output Y3" is associated with a positional relationship "electronic device is positioned in front of own apparatus, at distance of X2 or larger and smaller than X3." Herein, X3>X2>X1, and Y3>Y2>Y1 are established.

Accordingly, the electronic device 2 can be charged with the voltage in the proper range at any distance between the information processing apparatus 40 and the electronic device 2. Hence, a phenomenon in which a charge voltage is decreased and a charge time is increased because the distance between the information processing apparatus 40 and the electronic device 2 is large, or a phenomenon in which an excessive voltage is applied and the electronic device 2 is broken because the distance between the information processing apparatus 40 and the electronic device 2 is small, can be prevented from occurring.

[Flow of Processing]

Next, a flow of processing executed by the information processing apparatus 40 is described with reference to FIG. 14. FIG. 14 is a flowchart showing an example of processing executed by the information processing apparatus 40. Processing from S11 to S14 is similar to the processing from S1 to S4 in FIG. 11, and hence the description thereof is omitted.

In S15, the positional-relationship specification unit 18 specifies the type of the electronic device 2. In this case, the positional-relationship specification unit 18 requests transmission of a device ID for specifying the type of the electronic device 2, references the device ID received in response to the request, and specifies the type. The positional-relationship specification unit 18 outputs the specified type and the positional relationship to the processing execution unit 43 (S16).

Then, the processing execution unit 43, which has received the output of the type and the positional relationship, references the processing specification table 42, and specifies processing associated with the type and the positional relationship (S17). Also, the processing execution unit 43 determines whether or not the specified processing is the processing of charging the electronic device 2 (S18).

If it is determined that the specified processing is not the processing of charging the electronic device 2 (NO in S18), the processing execution unit 43 executes the processing specified from the processing specification table 42. After the execution of the processing is completed, the processing execution unit 43 notifies the positional-relationship specification unit 18 about the completion of the processing, and hence the processing goes to S23.

In contrast, if it is determined that the specified processing is the processing of charging the electronic device 2 (YES in S18), the processing execution unit 43 executes the charge processing specified from the processing specification table 42. That is, the charge unit 41 is operated with the output specified from the processing specification table 42, and the charge of the electronic device 2 is started (S20).

In this case, it is expected that the electronic device 2 transmits a charge completion notification to the information processing apparatus 40 when the charge is completed. Owing to this, the information processing apparatus 40 receives the charge completion notification after the charge of the electronic device 2 is completed (S21), and if the processing execution unit 43 checks that the charge completion notification is received, the processing execution unit 43 causes the charge unit 41 to terminate the charge (S22).

In this way, since the electronic device 2 transmits the charge completion notification, the charge is not continued after the charge is completed. The consuming power can be prevented from being wasted. After the execution of the processing is completed, the processing execution unit 43 notifies the positional-relationship specification unit 18 about the completion of the processing, and hence the processing goes to S23.

In S23, the positional-relationship specification unit 18 determines whether or not the positional relationship in S12 is dissolved. Specifically, the positional-relationship specification unit 18 determines whether or not the positional relationship between the information processing apparatus 1 and the electronic device 2 is dissolved from the detection result at this time output from the detection unit 12.

At this time, if it is determined that the positional relationship is dissolved, the positional-relationship specification unit 18 notifies the processing execution unit 43 about the dissolution. Then, the processing execution unit 43, which has received this notification, references the processing specification table 42, specifies the processing when the positional relationship is dissolved (S24). Thus, the processing executed by the information processing apparatus 40 is ended.

In the description provided above, the processing when the positional relationship is dissolved is described in the positional-relationship specification table 42. However, it is not limited thereto as long as the processing when the positional relationship is dissolved can be specified by the processing specification unit 43. For example, the processing execution unit 43 may store the processing when the positional relationship is dissolved. Also, for example, a table in which a positional relationship is associated with processing when the positional relationship is dissolved is stored separately from the processing specification table 42, and the processing when the positional relationship is dissolved may be specified with reference to the table.

[Third Embodiment]

In the above-described embodiment, the information processing apparatus detects that the predetermined positional relationship is held and specifies the processing associated with the positional relationship. In a processing execution system of the invention, one of the information processing apparatus and the electronic device may perform the processing of the detection and the specification. That is, means for detecting that the positional relationship between the electronic device and the information processing apparatus is the predetermined positional relationship may be included in the electronic device or the information processing apparatus. Means for specifying the processing associated with the positional relationship may be included in the electronic device or the information processing apparatus.

Figure 15:
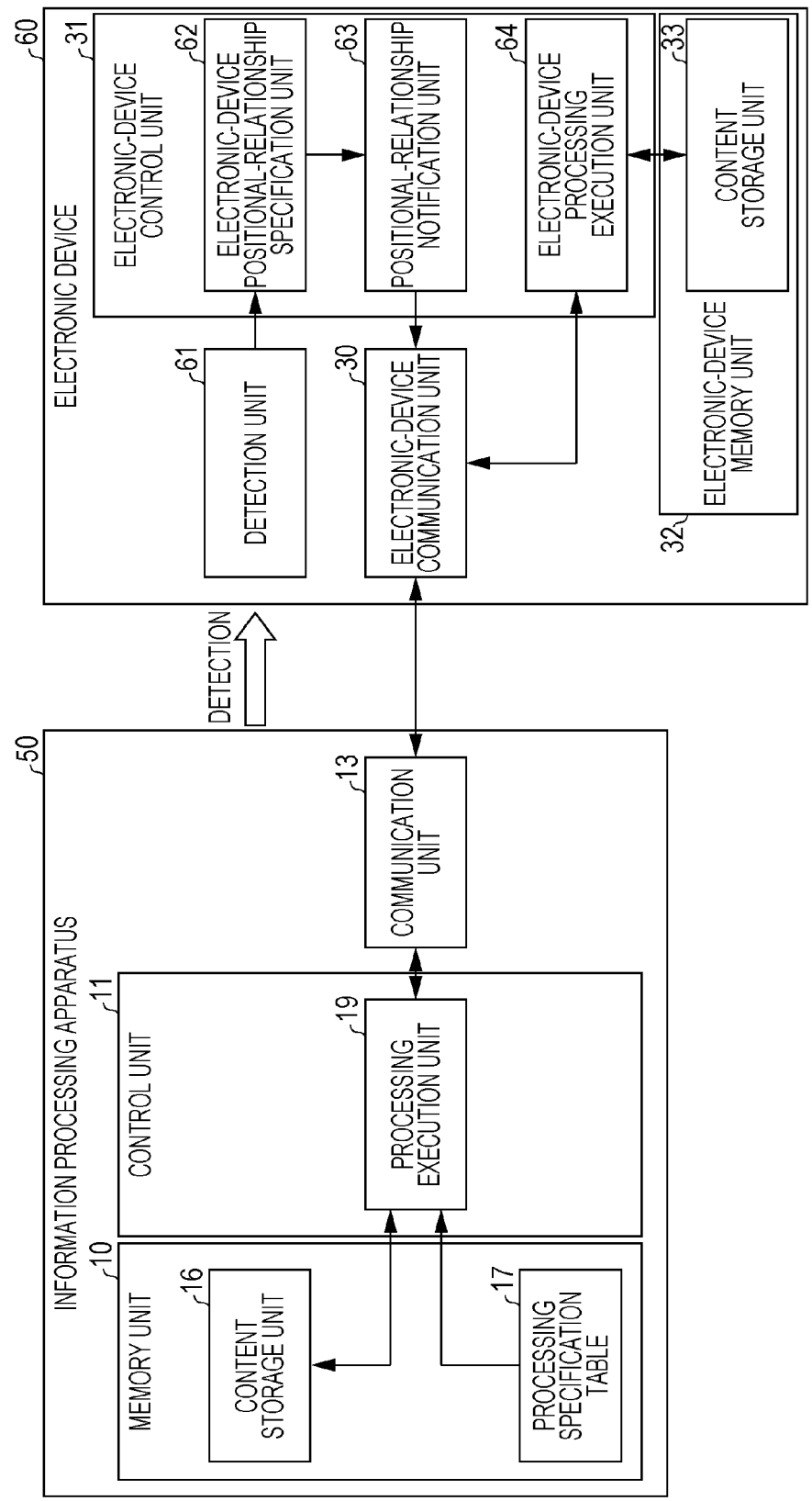
FIG. 15 is a block diagram showing configurations of primary portions of an information processing apparatus and an electronic device according to still another embodiment of the invention.

A processing execution system of a third embodiment of the invention is described with reference to FIG. 15. The processing execution system of this embodiment is a system including an information processing apparatus 50 and an electronic device 60. In this processing execution system, the electronic device 60 detects the positional relationship between the information processing apparatus 50 and the electronic device 60, the detected positional relationship is notified to the information processing apparatus 50, and hence the processing associated with the positional relationship is executed by the information processing apparatus 50. In the following description, the same reference signs are applied to configurations similar to those in the above-described embodiment, and the description thereof is omitted.

[Configurations of Information Processing Apparatus and Electronic Device]

First, configurations of the information processing apparatus 50 and the electronic device 60 are described with reference to FIG. 15. FIG. 15 is a block diagram showing configurations of primary portions of the information processing apparatus 50 and the electronic device 60.

The information processing apparatus 50 differs from the information processing apparatus 1 in FIG. 1 in that the information processing apparatus 50 does not include the detection unit 12 or the positional-relationship specification unit 18. In the example in FIG. 15, the table generation unit 20, the input unit 14, and the display unit 15 are not illustrated. However, these configurations may be included.

The electronic device 60 differs from the electronic device 2 in FIG. 1 in that the electronic device 60 includes a detection unit 61, and the electronic-device control unit 31 includes an electronic-device positional-relationship specification unit (electronic-device detection means) 62, a positional-relationship notification unit (notification means) 63, and an electronic-device processing execution unit (reception means) 64.

The detection unit 61 detects the information processing apparatus 50, and outputs the detection result to the electronic-device positional-relationship specification unit 62. The detection unit 61 may be similar to the detection unit 12 of the information processing apparatus 1.

The electronic-device positional-relationship specification unit 62 determines whether or not the positional relationship with respect to the information processing apparatus 50 matches any of predetermined positional relationships from the detection result of the detection unit 61, and if the matching is determined, checks whether or not the positional relationship is held for a predetermined time or longer. If the held state is checked, the electronic-device positional-relationship specification unit 62 outputs the positional relationship to the positional-relationship notification unit 63. That is, the electronic-device positional-relationship specification unit 62 performs processing similar to that of the positional-relationship specification unit 18 of the information processing apparatus 1.

The positional-relationship notification unit 63 notifies the information processing apparatus 50 about the positional relationship output from the electronic-device positional-relationship specification unit 62 through the electronic-device communication unit 30. Then, the processing execution unit 19 of the information processing apparatus 50 receives the notification through the communication unit 13, specifies the processing corresponding to the notified positional relationship with reference to the processing specification table 17, and executes the specified processing.

The processing specification table 17 of this embodiment includes processing of transmitting an instruction or information to the electronic device 60. That is, the information processing apparatus 50 transmits an instruction or information corresponding to the positional relationship notified from the electronic device 60, to the electronic device 60.

The electronic-device processing execution unit 64 receives the above-mentioned instruction or information transmitted by the information processing apparatus 50, and performs processing based on the received instruction or information. For example, if a request for transmission of a content is received, the content is transmitted in response to the request.

[Flow of Processing]

Figure 16:
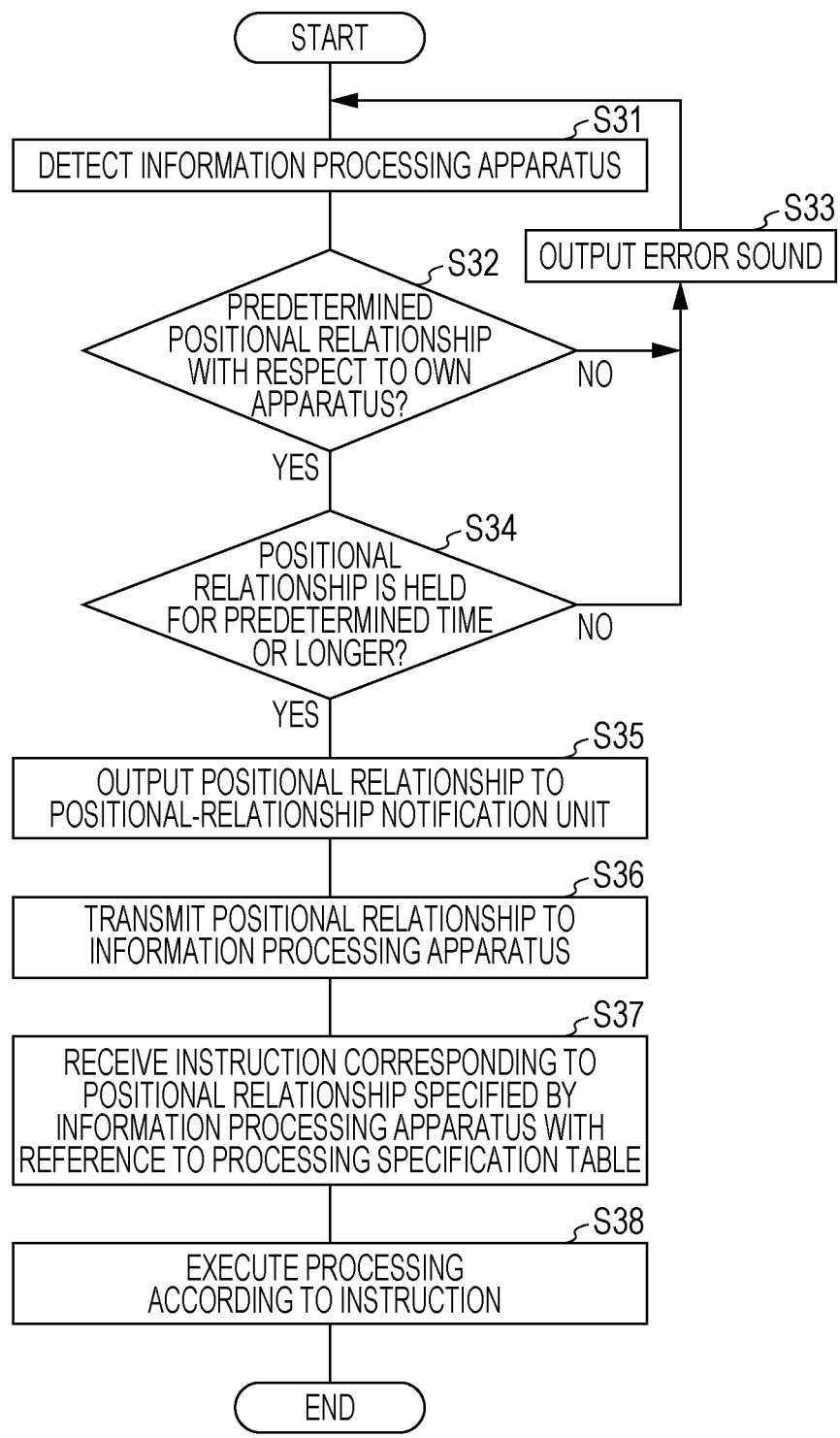
FIG. 16 is a flowchart showing an example of processing executed by the electronic device.

Next, a flow of processing executed by the electronic device 60 is described with reference to FIG. 16. FIG. 16 is a flowchart showing an example of processing executed by the electronic device 60. Processing from S31 to S34 is similar to the processing from S1 to S4 in FIG. 11, and hence the description thereof is briefly described.

First, the detection unit 61 detects the information processing apparatus 50 (S31), and outputs the detection result to the electronic-device positional-relationship specification unit 62. Then, the electronic-device positional-relationship specification unit 62 determines which one of predetermined positional relationships matches the positional relationship between the electronic device 60 and the detected information processing apparatus 50 from the output detection result (S32). The predetermined positional relationships are included in the processing specification table 17. The electronic-device positional-relationship specification unit 62 preparatorily stores such positional relationships.

If it is determined that the positional relationship does not match any of the predetermined positional relationships (NO in S32), the electronic-device positional-relationship specification unit 62 causes the electronic device 60 to output an error sound to notify the user about that the positional relationship is improper (S33), and the processing returns to S31.

In contrast, if it is determined that the positional relationship matches the predetermined positional relationship (YES in S32), the electronic-device positional-relationship specification unit 62 determines whether or not the positional relationship is held for a predetermined time or longer (S34; detection step). If it is determined that the positional relationship is not held (NO in S34), the electronic-device positional-relationship specification unit 62 causes the error sound to be output (S33), and the processing returns to S31.

In contrast, if it is determined that the positional relationship is held (YES in S34), the electronic-device positional-relationship specification unit 62 outputs the positional relationship, which has been determined as being held, to the positional-relationship notification unit 63 (S35). Then, the positional-relationship notification unit 63 notifies the information processing apparatus 50 about the output positional relationship through the electronic-device communication unit 30 (S36; notification step).

In the information processing apparatus 50, which has received this notification, the processing execution unit 19 references the processing specification table 17, specifies processing corresponding to the positional relationship, and executes the specified processing. In this case, it is assumed that processing for transmitting a certain instruction (for example, an instruction for transmitting a content) to the electronic device 60 is executed.

Hence, the electronic device 60 receives the instruction transmitted by the processing execution unit 19 (S37; reception step). This instruction is transmitted from the electronic-device communication unit 30 to the electronic-device processing execution unit 64, the electronic-device processing execution unit 64 executes the processing in response to the received instruction, and thus the processing of the electronic device 60 is ended. For example, if the received instruction is a request for transmission of a content, the requested content is read from the content storage unit 33 and transmitted to the information processing apparatus 50.

[Modification]

Each of above-described embodiments has provided the example in which the processing corresponding to the positional relationship is specified by using the processing specification table 17 or the processing specification table 42. However, information used for specifying processing is only required to be information that allows processing to be specified from a positional relationship, and the form of information is not limited to the table form.

Also, each of the above-described embodiments has provided the example in which the positional relationship is detected by the information processing apparatus 1, 40 or the electronic device 60. However, the positional relationship may be detected by a device other than these devices. For example, a sensor or a camera, which is provided separately from the information processing apparatus 1 and the electronic device 2 may detect the positional relationship between the information processing apparatus 1 and the electronic device 2, and notify the information processing apparatus 1 about the detection result.

The above-described embodiment has provided the example in which the electronic device is charged if the predetermined relationship is established. However, the electronic device may be discharged if a predetermined relationship is established. In this case, the electronic device and the information processing apparatus are connected in a wired manner, the information processing apparatus includes a discharge unit that causes the electronic device to be discharged through the wired connection, and the processing specification table may store such that the positional relationship is associated with the discharge processing. Other method of causing the electronic device to be discharged may be, for example, a method of discharging by controlling a charger or a cradle of the electronic device.

Accordingly, the electronic device, which is not used for a long term, can be discharged only by placing the electronic device at a predetermined position. Also, a rechargeable battery of the electronic device may be discharged so that the life of the rechargeable battery does not decrease.

Also, the above-described embodiment has provided the example in which, when the electronic device is caused to transmit a content to the information processing apparatus, a content request, that is, an instruction for transmitting a content, or an instruction for displaying a screen to select reception or non-reception of a content is transmitted from the information processing apparatus to the electronic device. However, it is not limited to this example, and the information processing apparatus is only required to transmit an instruction (or information) so that the content is finally transmitted from the electronic device in response to the instruction.

For example, a specified positional relationship may be notified to the electronic device, and a content corresponding to the positional relationship may be transmitted. In this case, the electronic device has to be able to reference correspondence information in which the positional relationship is associated with the processing of transmitting the content. Alternatively, for example, information indicative of a storage target address of the content may be transmitted. In this case, the electronic device acquires the content by using the address, and transmits the content to the information processing apparatus.

Also, the above-described embodiment has provided the example in which the information processing apparatus 1 is a stationary device, and the electronic device 2 is a portable device. However, the information processing apparatus 1 may be a portable device. That is, the user may execute processing by, for example, moving the information processing apparatus 1 and hence establishing a predetermined positional relationship between the information processing apparatus 1 and the electronic device 2. Of course, both the information processing apparatus 1 and the electronic device 2 may be portable devices.

As described above, the detection for the positional relationship in the case in which the information processing apparatus 1 is a portable device may be realized by the method described in the above-described embodiment (for example, detection using infrared rays). Also, the positional relationship may be detected by the electronic device 2 or other device, and information indicative of the positional relationship may be acquired from the device.

The invention is not limited to the above-described embodiments, and may be modified in various ways within the scope defined by the claims. Also, technical means disclosed in one of the embodiments may be applied to and combined with different one of the embodiments, and even such a combined embodiment is included in the technical scope of the invention.

Finally, the respective blocks in the information processing apparatus 1, 40, 50 and the electronic device 60, in particular, the control unit 11 and the electronic-device control unit 31 may be realized in a form of hardware by a logic circuit formed on an integrated circuit (IC chip), or may be provided in a form of software by using a CPU (central processing unit).

In the latter case, the information processing apparatus 1, 40, 50 and the electronic device 60 include a CPU that executes an instruction of a program that realizes respective functions, a ROM (read only memory) that stores the program, a RAM (random access memory) that develops the program, and a memory device (storage medium) such as a memory that stores the program and various data. The object of the invention can be also attained by supplying a storage medium, in which a program code (execute form program, intermediate code program, source program) for a control program, i.e., software that realizes the above-described functions, of the information processing apparatus 1, 40, 50 and the electronic device 60, is stored readably by a computer, and by reading and executing the program code stored in the storage medium by the computer (or CPU or MPU).

The storage medium may use any of tapes, such as a magnetic tape and a cassette tape; any of disks including magnetic disks, such as a Floppy (registered trademark) disk and a hard disk, and optical discs, such as a CD-ROM, a MO, a MD, a DVD, and a CD-R; any of cards, such as an IC card (including memory card) and an optical card; any of semiconductor memories, such as a mask ROM, an EPROM, an EEPROM, and a flash ROM; or any of logic circuits, such as a PLD (programmable logic device) and a FPGA (field programmable gate array).

Also, the information processing apparatus 1, 40, 50 and the electronic device 60 may be connected with a communication network, and the program code may be supplied through the communication network. This communication network is not particularly limited as long as the communication network can transmit the program code. For example, the Internet, an intranet, an extranet, a LAN, an ISDN, a VAN, a CATV communication network, a virtual private network, a telephone line network, a mobile communication network, or a satellite communication network may be used. Also, a transmission media forming the communication network is only required to transmit the program code, and hence is not limited to a specific configuration or a specific type. For example, the transmission medium may be a wired configuration, such as IEEE1394, a USB, a power-line carrier, a cable TV line, a telephone line, or ADSL (asymmetric digital subscriber line); or a wireless configuration, such as an infrared ray like the IrDA or a remote controller, Bluetooth (registered trademark), IEEE802.11 radio, HDR (high data rate), NFC (near field communication), DLNA (digital living network alliance), a cellular phone network, a satellite line, or a digital terrestrial network. The invention may be realized in a form of a computer data signal included in a carrier wave, the computer data signal which is implemented by electronic transmission of the program code.

[Invention Described in Each of Aforementioned Embodiments]

As described above, an information processing apparatus of the invention includes detection means for detecting that a positional relationship between the electronic device and the own apparatus is a predetermined positional relationship; and processing execution means for, if the detection means detects that the positional relationship between the electronic device and the own apparatus is held continuously for a predetermined time or longer, referencing correspondence information in which the predetermined positional relationship is associated with processing to be executed for the positional relationship, specifying the processing, and executing the specified processing.

Preferably, in the correspondence information, processing corresponding to a type of the electronic device may be associated; the information processing apparatus may further include type specification means for specifying the type of the electronic device; and the processing execution means, if the detection means detects that the positional relationship between the electronic device and the own apparatus is held continuously for the predetermined time or longer, references the correspondence information, may specify the processing corresponding to the type specified by the type specification means, and may execute the specified processing.

With the above-described configuration, the type of electronic device is specified, the processing is specified with reference to the correspondence information in which the processing corresponding to the type of electronic device is associated, and the processing is executed. Accordingly, the user can cause the information processing apparatus to execute the processing corresponding to the type of electronic device only by bringing the electronic device and the information processing apparatus into the predetermined positional relationship.

In this case, the correspondence information may include processing of transmitting an instruction or information to the electronic device although the processing is not particularly limited as long as the processing relates to the electronic device.

With this configuration, the instruction or the information can be transmitted from the information processing apparatus to the electronic device only by bringing the electronic device and the information processing apparatus into the predetermined positional relationship.

Also, the correspondence information may include processing of transmitting the instruction or the information to the electronic device and causing the electronic device to transmit a content to the own apparatus, or processing of transmitting a content to the electronic device.

With this configuration, the content can be acquired by the information processing apparatus or the electronic device only by bringing the electronic device and the information processing apparatus into the predetermined positional relationship. It is to be noted that, if the information is transmitted to the electronic device to cause the electronic device to transmit the content, the information may be any information as long as the content is finally transmitted from the electronic device as the result of the transmission of the information. For example, if the electronic device has a function of transmitting a content corresponding to a positional relationship, the information may represent the positional relationship.

Also, preferably, the correspondence information may includes processing of transmitting an instruction to the electronic device, the instruction which causes the electronic device to provide a display for causing a user of the electronic device to select allowance or disallowance for that the electronic device transmits a content to the own apparatus or that the electronic device receives a content transmitted from the own apparatus.

With the above-described configuration, by bringing the electronic device and the information processing apparatus into the predetermined positional relationship, the electronic device can be caused to provide the display to select the allowance or the disallowance for that the electronic device transmits the content to the information processing apparatus or that the electronic device receives the content transmitted from the information processing apparatus. Accordingly, the user of the electronic device can select the allowance or the disallowance for the transmission or the reception of the content.

In this case, the user of the electronic device has to perform an operation for selecting the allowance or the disallowance for the transmission or the reception of the content by, for example, a button operation or the like. However, since the display to select the allowance or the disallowance for the transmission or the reception of the content is provided only by bringing the electronic device and the information processing apparatus into a predetermined positional relationship, as compared with a related-art configuration, in which such a screen is called from a menu screen or the like by a button operation or the like and is displayed, user's operation is facilitated.

Of course, processing of allowing the transmission or the reception of the content and processing of disallowing the transmission or the reception of the content may be included in the correspondence information, and the processing from the display of the screen to select the allowance or the disallowance for the transmission or the reception of the content to the selection of the allowance or the disallowance may be executed by bringing the electronic device and the information processing apparatus into a predetermined positional relationship.

Also, in the correspondence information, processing may be associated with each of a plurality of the positional relationships.

With the above-described configuration, in the correspondence information, the processing is associated with each of the plurality of positional relationships. Accordingly, when a certain positional relationship is established, processing associated with the positional relationship can be executed, and when another positional relationship is established, processing associated with the positional relationship can be executed.

Also, preferably, the detection means may detect that an orientation of the electronic device with respect to the own apparatus is a predetermined first orientation or a second orientation being different from the first orientation; in the correspondence information, the processing of transmitting the instruction to the electronic device, the instruction which causes the electronic device to transmit the content to the own apparatus, may be associated with the positional relationship, in which the orientation of the electronic device is the first orientation with respect to the own apparatus; and in the correspondence information, the processing of transmitting the content to the electronic device may be associated with the positional relationship, in which the orientation of the electronic device is the second orientation with respect to the own apparatus.

With the above-described configuration, when the electronic device has the first orientation with respect to the information processing apparatus, the positional relationship is detected by the detection means, and the transmission instruction for the content is transmitted to the electronic device on the basis of the correspondence information. In contrast, when the electronic device has the second orientation with respect to the information processing apparatus, the content is transmitted to the electronic device.

That is, with the above-described configuration, the content can be transmitted or received by changing the orientation of the electronic device. Accordingly, the user can easily change the transmission and the reception of the content. In particular, when the second orientation is changed to the first orientation, by inverting the orientation, the opposite processing of the transmission and the reception is performed. This is preferable because the user can change the transmission and the reception by intuition.

Also, preferably, the processing associated with the different positional relationships of the correspondence information may include processing of transmitting an instruction to the electronic device, the instruction which causes the electronic device to transmit a content with a different attribute or processing of transmitting a content with a different attribute to the electronic device.

With the above-described configuration, when the electronic device and the information processing apparatus are brought into a certain positional relationship, a content with an attribute corresponding to the positional relationship can be transmitted to the electronic device or received from the electronic device.

That is, with the above configuration, the user can change the attribute of the content to be acquired by the electronic device or the information processing apparatus only by a simple operation of changing the positional relationship between the electronic device and the information processing apparatus. Also, a content with a proper attribute corresponding to a positional relationship can be acquired. For example, a content with an attribute of an electronic book can be transmitted if the electronic device is in a study room, and a content with an attribute of music can be transmitted if the electronic device is in a living room.

Also, preferably, the information processing apparatus may further include a charge unit that charges the electronic device. In the correspondence information, processing of operating the charge unit with an output corresponding to a distance with respect to the own apparatus and charging the electronic device may be associated so that the electronic device is charged with a voltage in a proper range at any distance between the electronic device and the own apparatus.

With the above-described configuration, the electronic device can be charged by bringing the electronic device and the information processing apparatus into the predetermined positional relationship. Also, by using the above-described correspondence information, the operation output of the charge unit corresponds to the distance between the information processing apparatus and the electronic device, and charge with a voltage in a proper range can be always performed.

Also, preferably, the information processing apparatus may further include a discharge unit that causes the electronic device to be discharged. The correspondence information may include processing of causing the electronic device to be discharged by the discharge unit.

With the above-described configuration, the electronic device can be discharged by bringing the electronic device and the information processing apparatus into the predetermined positional relationship. Accordingly, for example, the electronic device, which is not used for a long term, may be easily discharged. Also, by causing the electronic device to be discharged before the charge, and then charging the electronic device, the life of a rechargeable battery of the electronic device can be prevented from decreasing.

Also, preferably, the processing execution means, if the detection means no longer detects that the positional relationship between the electronic device and the own apparatus is the predetermined positional relationship, may reference dissolution correspondence information, in which a positional relationship is associated with processing to be executed if the positional relationship is dissolved, may specify the processing to be executed if the positional relationship is dissolved, and may execute the specified processing.

With the above-described configuration, if the detection means no longer detects that the positional relationship between the electronic device and the information processing apparatus is the predetermined positional relationship, the processing, which is specified with reference to the dissolution correspondence information and is to be executed when the positional relationship is dissolved, is executed.

That is, with the above-described configuration, when the information processing apparatus and the electronic device are brought into a certain positional relationship, processing corresponding to the positional relationship can be executed by the information processing apparatus, and even when the positional relationship is dissolved, processing corresponding to the dissolved positional relationship can be executed by the information processing apparatus.

Also, preferably, the dissolution correspondence information may include, as the processing to be executed if the positional relationship is dissolved, processing of transmitting an instruction to the electronic device and bringing the electronic device into a key lock state.

With the above-described configuration, when the predetermined positional relationship is dissolved, the electronic device is brought into the key lock state. Accordingly, the user can omit a troublesome work of providing the key lock by himself/herself. Also, this may be a countermeasure for leakage of information if a person other than the user takes the electronic device out.

Also, to solve the above-described problems, an electronic device of the invention is an electronic device that receives an instruction or information from an information processing apparatus and performs processing. The electronic device includes electronic-device detection means for detecting that a positional relationship between the information processing apparatus and the own device is a predetermined positional relationship and the positional relationship is held continuously for a predetermined time or longer; notification means for notifying the information processing apparatus about the positional relationship detected by the electronic-device detection means; and reception means for receiving an instruction or information from the information processing apparatus, the instruction or the information corresponding to the positional relationship that is specified by the information processing apparatus with reference to correspondence information in which the predetermined positional relationship is associated with the instruction or the information to be transmitted for the positional relationship, and that is notified by the notification means.

It is to be noted that the information processing apparatus and the electronic device may be realized by a computer. In this case, a control program for realizing the information processing apparatus or the electronic device by causing a computer to operate as the respective means of the information processing apparatus or the electronic device, and a computer-readable storage medium storing the control program are included in the scope of the invention.

INDUSTRIAL APPLICABILITY

The invention can be applied to an electronic device and an information processing apparatus that performs processing relating to the electronic device. Accordingly, the information processing apparatus can be easily operated. The electronic device may be, for example, a cellular phone, a smartphone, a tablet terminal, or a portable game player. The information processing apparatus may be, for example, a home server, a BD recorder, or a television receiver.

REFERENCE SIGNS LIST

1, 40, 50 information processing apparatus
17 processing specification table (correspondence information)
41 charge unit
42 processing specification table (correspondence information, dissolution correspondence information)
18 positional-relationship specification unit (detection means)
19, 43 processing execution unit (processing execution means)
2, 60 electronic device
62 electronic-device positional-relationship specification unit (electronic-device detection means)
63 positional-relationship notification unit (notification means)
64 electronic-device processing execution unit (reception means)
3 processing execution system

The invention claimed is:

1. An information processing apparatus that performs processing relating to an electronic device, comprising:
   detection circuitry that detects a positional relationship between the electronic device and the own apparatus is a predetermined positional relationship;
   processing execution circuitry for, if the detection circuitry detects that the positional relationship between the electronic device and the own apparatus is held continuously for a predetermined time or longer, referencing correspondence information in which the predetermined positional relationship is associated with processing to be executed for the positional relationship, specifying the processing, and executing the specified processing; and
   discharge circuitry that causes the electronic device to be discharged; wherein
   the correspondence information includes processing information which causes the electronic device to be discharged by the discharge circuitry.

2. The information processing apparatus according to claim 1,
   wherein, in the correspondence information, processing corresponding to a type of the electronic device is associated,
   wherein the information processing apparatus further comprises type specification circuitry which specifies the type of the electronic device, and
   wherein the processing execution circuitry, if the detection circuitry detects that the positional relationship between the electronic device and the own apparatus is held continuously for the predetermined time or longer, references the correspondence information, specifies the processing corresponding to the type specified by the type specification circuitry, and executes the specified processing.

3. The information processing apparatus according to claim 1, wherein the correspondence information includes processing of transmitting an instruction or information to the electronic device.

4. The information processing apparatus according to claim 1, wherein the correspondence information includes processing of transmitting the instruction or the information to the electronic device and causing the electronic device to transmit a content to the own apparatus, or processing of transmitting a content to the electronic device.

5. The information processing apparatus according to claim 1, wherein the correspondence information includes processing of transmitting an instruction to the electronic device, the instruction which causes the electronic device to provide a display for causing a user of the electronic device to select allowance or disallowance for that the electronic device transmits a content to the own apparatus or that the electronic device receives a content transmitted from the own apparatus.

6. The information processing apparatus according to claim 1, wherein, in the correspondence information, processing is associated with each of a plurality of the positional relationships.

7. The information processing apparatus according to claim 6,
   wherein the detection circuitry detects that an orientation of the electronic device with respect to the own apparatus is a predetermined first orientation or a second orientation being different from the first orientation, wherein, in the correspondence information, the processing of transmitting the instruction to the electronic device, the instruction which causes the electronic device to transmit the content to the own apparatus, is associated with the positional relationship, in which the orientation of the electronic device is the first orientation with respect to the own apparatus, and wherein, in the correspondence information, the processing of transmitting the content to the electronic device is associated with the positional relationship, in which the orientation of the electronic device is the second orientation with respect to the own apparatus.

8. The information processing apparatus according to claim 6, wherein the processing associated with the different positional relationships of the correspondence information includes processing of transmitting an instruction to the electronic device, the instruction which causes the electronic device to transmit a content with a different attribute or processing of transmitting a content with a different attribute to the electronic device.

9. The information processing apparatus according to claim 6, further comprising:

charge circuitry that charges the electronic device, wherein, in the correspondence information, processing of operating the charge circuitry with an output corresponding to a distance with respect to the own apparatus and charging the electronic device is associated so that the electronic device is charged with a voltage in a proper range at any distance between the electronic device and the own apparatus.

10. The information processing apparatus according to claim 1, wherein the processing execution circuitry, if the detection circuitry no longer detects that the positional relationship between the electronic device and the own apparatus is the predetermined positional relationship, references dissolution correspondence information, in which a positional relationship is associated with processing to be executed if the positional relationship is dissolved, specifies the processing to be executed if the positional relationship is dissolved, and executes the specified processing.

11. The information processing apparatus according to claim 10, wherein the dissolution correspondence information includes, as the processing to be executed if the positional relationship is dissolved, processing of transmitting an instruction to the electronic device and bringing the electronic device into a key lock state.

12. A control method for an information processing apparatus that performs processing relating to an electronic device, comprising:

a detection step of detecting that a positional relationship between the electronic device and the information processing apparatus is a predetermined positional relationship;

a processing specification step of, if it is detected that the positional relationship between the electronic device and the information processing apparatus is held continuously for a predetermined time or longer in the detection step, referencing correspondence information in which the predetermined positional relationship is associated with processing to be executed for the positional relationship and specifying the processing; and a processing execution step of executing the processing specified in the processing specification step; wherein the correspondence information includes processing information which causes the electronic device to be discharged by discharge circuitry that cause the electronic device to be discharged.

13. A control method for an electronic device that receives an instruction or information from an information processing apparatus and performs processing, comprising:

a detection step of detecting that a positional relationship between the information processing apparatus and the electronic device is a predetermined positional relationship and the positional relationship is held continuously for a predetermined time or longer;

a notification step of notifying the information processing apparatus about the positional relationship detected in the detection step; and a reception step of receiving an instruction or information from the information processing apparatus, the instruction or the information corresponding to the positional relationship that is specified by the information processing apparatus with reference to correspondence information in which the predetermined positional relationship is associated with the instruction or the information to be transmitted for the positional relationship, and that is notified in the notification step; wherein the correspondence information includes processing information which causes the electronic device to be discharged by discharge circuitry that cause the electronic device to be discharged.

14. A non-transitory computer-readable storage medium containing a control program for causing a computer to execute a control method according to claim 12.

15. A non-transitory computer-readable storage medium containing a control program for causing a computer to execute a control method according to claim 13.

* * * * *